United States Patent [19]

Cobb et al.

[11] 3,805,237

[45] Apr. 16, 1974

[54] TECHNIQUE FOR THE CONVERSION TO DIGITAL FORM OF INTERSPERSED SYMBOLIC AND GRAPHIC DATA

[75] Inventors: Richard O. Cobb; Albert C. Moore, both of Poughkeepsie, N.Y.

[73] Assignee: International Business Machines Corporation, Armonk, N.Y.

[22] Filed: Apr. 30, 1971

[21] Appl. No.: 139,113

[52] U.S. Cl. ................ 340/146.3 H, 340/146.3 AG

[51] Int. Cl. ................ G06k 9/12

[58] Field of Search ................ 340/146.3

[56] References Cited

UNITED STATES PATENTS

| | | | |
|---|---|---|---|
| 3,564,498 | 2/1971 | Stern | 340/146.3 |
| 3,196,398 | 7/1968 | Baskin | 340/146.3 |
| 3,496,543 | 2/1970 | Greenly | 340/146.3 H |
| 3,234,513 | 2/1966 | Brust | 340/146.3 AG |
| 3,297,993 | 1/1967 | Clapper | 340/146.3 J |
| 3,496,542 | 2/1970 | Rabinow | 340/146.3 AG |
| 3,588,822 | 6/1971 | Yamamoto | 340/146.3 J |

OTHER PUBLICATIONS

S. H. Unger, "Pattern Detection and Recognition, April 30, 1959, Proceedings of the IRE, pp. 1737 to 1751.

*Primary Examiner*—Paul J. Henon
*Assistant Examiner*—Robert F. Gnuse
*Attorney, Agent, or Firm*—Charles E. Rohrer; Charles E. Rohrer

[57] ABSTRACT

A system for computerizing changes to engineering drawings by separating graphical and textual information in a digital representation of a drawing so that desired changes can be made to the digital representation. Separation is accomplished by scanning the document and analyzing it element by element until all objects have been separated one from another. Special purpose circuitry is provided to test for connectivity between one state bits in a single row and adjacent one state bits in the directly neighboring row.

4 Claims, 23 Drawing Figures

FIG. 1

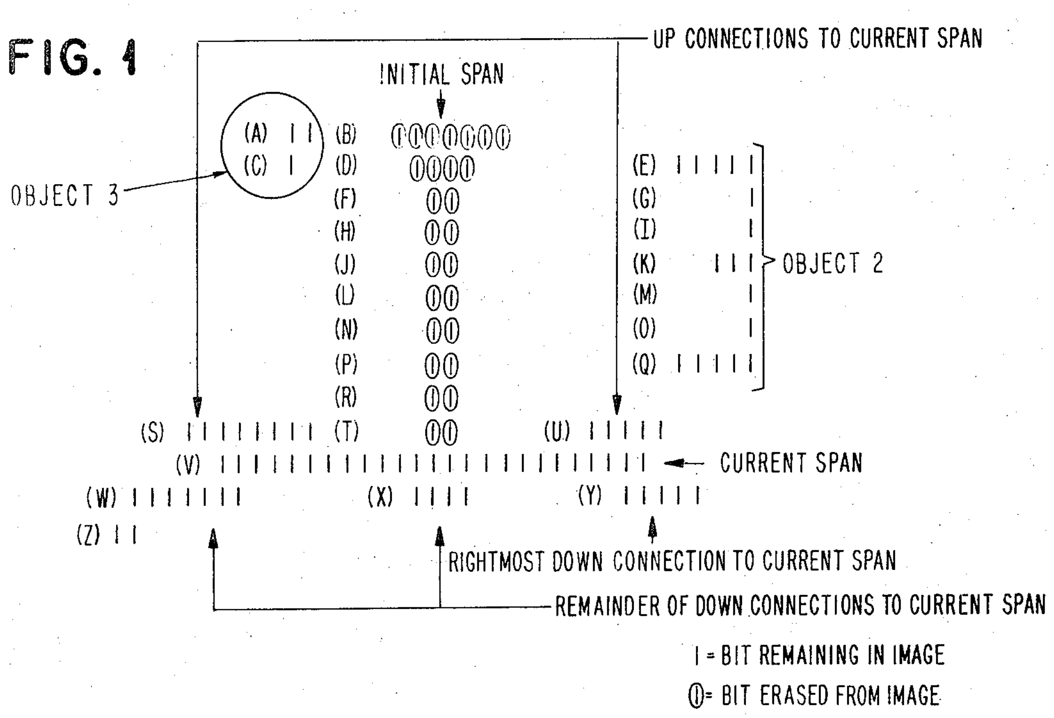

OBJECT I = B,D,F,H,J,L,N,P,R,S,T,U,V,W,X,Y,Z
SEGMENT I = B,D,F,H,J,L,N,P,R,T,V,Y.
ELEMENT I = SPAN B
ELEMENT 2 = SPAN D
⋮
ELEMENT I2 SPAN Y
SEGMENT 2 = X
ELEMENT I = SPAN X
SEGMENT 3 = W,Z
ELEMENT I = SPAN W
ELEMENT 2 = SPAN Z
SEGMENT 4 = U
ELEMENT I = SPAN U
SEGMENT 5 = S
ELEMENT I = SPAN S

OBJECT 2 = E,G,I,K,M,O,Q
SEGMENT I = E,G,I,K,M,O,Q
ELEMENT I = SPAN E
ELEMENT 2 = SPAN G
⋮
ELEMENT 7 = SPAN Q

OBJECT 3 = A,C
SEGMENT I = A,C
ELEMENT I = SPAN A
2 = SPAN C

INVENTORS
RICHARD O. COBB
ALBERT C. MOORE

BY Chas. Rohrer
ATTORNEY

PATENTED APR 16 1974 3,805,237

SHEET 08 OF 20

TECHNIQUE FOR THE CONVERSION TO DIGITAL FORM OF INTERSPERSED SYMBOLIC AND GRAPHIC DATA

This invention relates to a system for converting delineated information in a source document to a computer acceptable form and more particularly to a conversion system which includes a method for separating distinct objects on the source document one from another.

BACKGROUND OF THE INVENTION

Engineering drawings are an example of documents which contain arbitrarily interspersed graphic and textual information. To process that type of information in a digital computer it must first be converted to a form acceptable to the computer. One approach to conversion assumes that the information can be conveniently catagorized by pattern or character recognition along; i.e., that all objects in the drawing belong to a finite collection of patterns and addressed by recognition devices on the basis that at no time will a given size field of view contain more than one pattern. This approach has been used most successfully in converting textual information to digital form. In engineering drawings, however, graphic and textual information are arbitrarily interspersed so that the presence of one and only one pattern in a fixed-size field of view cannot be assumed.

Another approach to conversion has been developed and used most successfully for the conversion of graphical information to digital form. Line or curve following devices of the X–Y digitizer type permit one, using a stylus, to follow the graphic information lines with the coordinates of the stylus being periodically sampled to provide a sequence of coordinates defining the graphic information. These semi-automatic devices are slow and although they are successful in cases where there is limited textual information in the absence of graphic information, the technique is primarily for graphic information in the absence of recognizable textual data.

There is a large class of documents typified by engineering drawings which contain interspersed information and which cannot be satisfactorily converted by existing approaches unless the separation of the interspersed information can first be accomplished.

SUMMARY OF THE INVENTION

This invention supplies a technique for the separation of graphic information from textual information where both exist in a source document which is being converted to digital form for the automatic processing desirable in adding to, deleting from, modifying, storing, or duplicating such information. The technique may utilize existing computer hardware to perform its entire function, but in the specific embodiment disclosed herein, special purpose hardware has been developed for performing part of the procedure so as to provide superior performance without the need for unduly complex software. Once information separation has been accomplished, customary methods for converting information, e.g., character recognition and/or digitizing techniques can be utilized efficiently and with good result.

Basically, this invention calls for the successive scanning of small portions of a source document, writing a digital input image of each small portion into computer memory, analyzing each input image element by element, segment by segment, object by object, until all separate and distinct objects in each input image have been separated one from another. After separation, each object is classified as textual, graphical or scrap and used as input to appropriate conversion routines.

BRIEF DESCRIPTION OF THE DRAWINGS

FIG. 1 provides an illustrative input image to define terms and illustrate procedure.

GENERAL DESCRIPTION OF THE SEPARATION PROCESS

Figure 2:
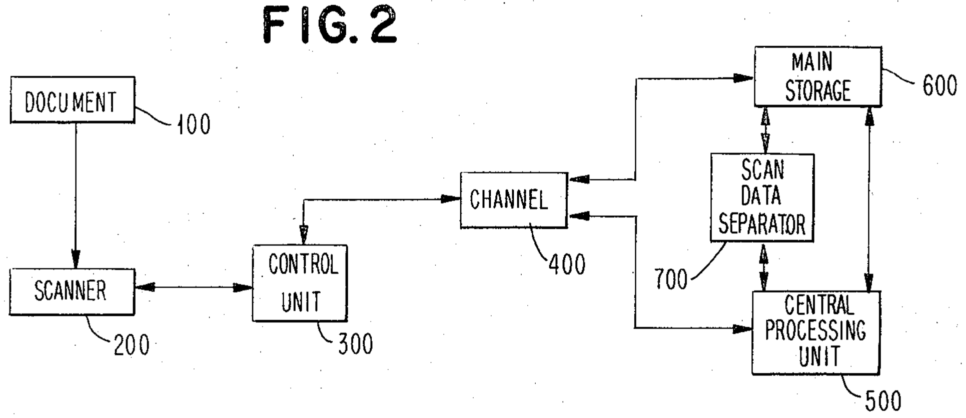
FIG. 2 is a representation of a computing system to practice the invention.

Engineering drawings normally consist of randomly interspersed graphic and alphanumeric data. In this invention, the two types of data will be separated by successively scanning and processing small portions of the source document to provide a binary map or image of the information contained on the document. Binary mapping may be defined as a process by which a document is scanned to detect for the presence or absence of a line at predetermined positions and storing a binary 1 in a corresponding binary storage element of an input array if the presence of a line is detected or storing a binary 0 if the absence of a line is detected. The binary map of the source document stored in the input array of binary storage elements may be termed a binary input image.

Referring now to FIG. 1, there is shown a binary input image of randomly interspersed graphic and alphanumeric data. In the binary input image, one state bits are considered connected when they are adjacent to one another in any direction, i.e., horizontal, vertical, or diagonal. Thus, we may define as an "object" a set of all one state connected bits in the binary input image. Three different types of objects are shown in FIG. 1, object 1 being graphic in nature, object 2 being alphanumeric in nature and object 3 being so small as to constitute scrap.

Certain other definitions need also be made in order to explain the invention. An element (of an object) is defined as a contiguous set or span of one state bits in a single horizontal row of the binary input image, e.g., in FIG. 1, span B represents an element of object 1. A segment (of an object) is defined as that particular connected set of elements formed by including only the rightmost downwardly connected element. For example, elements B, D, F, H, J, L, N, P, R, T, V and Y represent segment 1 of object 1.

An example of connected sets of elements in object 1 not included in segment 1 is shown with reference to span V as the current span, i.e., the element being analyzed. Note that spans W, X and Y all downwardly connect to span V and spans S and U upwardly connect to span V. However, only span Y forms a part of the same segment as span V because it alone is a "rightmost downwardly" connecting element. Spans W and X are located to the left of span Y in the same horizontal row and therefore, will be analyzed as separate segments. Note that when span W is analyzed a new connecting element in object 1, span Z, will be discovered. Spans S and U are examples of upwardly connecting elements and as such are not a part of segment 1 and will be analyzed as separate segments. Span T will not be noted as an upwardly connected element because in the separation process it will have been the element preceding span V in the analysis and will have been erased from the input image according to the invention procedure as described below.

In the separation process, segments are separated from the binary input image by transferring them in an element by element fashion to another array which is herein termed a binary segment image, with each element of the segment being erased from the binary input image after being transferred to the segment array. Thus, in the separation process, the first step is a search of the binary input image to find the first element of an object, i.e., the initial span of one state bits. The direction of the search is arbitrarily chosen to proceed initially from the top to the bottom of the binary input image. When the first non-zero horizontal row of the binary input image is encountered, the rightmost span of one state bits is arbitrarily selected as the initial span. This span is the first element of the first segment of the first object to be separated from the binary input image. This element is separated from the binary input image by performing a logic operation which transfers the initial element to a row of a segment array corresponding to the row of the binary input array at which the span was encountered and by erasing the span from the binary input array. Thus, in FIG. 1, the first element encountered will be span B; it will be the first span to be separated for analysis by transfer to a segment array and will be erased from the input image. Succeeding steps will erase additional elements from the input image until, when the current span is span V, all of the one state bits in object 1 shown encircled on FIG. 1 will have been erased.

In the analysis of an element and when the current span is the initial span, i.e., the first non-zero row in the binary input image, there can be no connections to the adjacent row above. Therefore, the next step is to look for connections between the initial span and the adjacent row below it. If the downwardly adjacent row contains more than one connecting span that fact is logged in a down connection list, which will be described hereinafter, by recording the row containing the current span as well as a copy of the current span. Those downward connecting spans, other than the rightmost connecting span, represent elements of other segments of the object and the list entries are made to provide a means for finding those other segments after the current segment has been separated. If multiple spans in the adjacent row are found connected to the initial span, then, after that fact is logged in the down connection list, the rightmost of the connecting spans is selected as the next current span. If only one span in the adjacent row is found connected to the initial span, then that span is selected as the next current span.

The next step is to separate the new current span, i.e., transfer it to the segment array and erase it from the input array, and to look for connections between that current span and the adjacent row above it. If the adjacent row above contains any connecting spans, that fact is logged in an up connection list, which will be described hereinafter, by recording the row containing the current span as well as a copy of the current span. Those connecting spans represent elements of other segments of the object and the list entries are made to provide a means for finding them after the current segment and segments from the down list have been separated.

The next step is to look for connections between this current span and the adjacent row below this current span, in the manner described above, updating the down connection list if multiple connections are detected. In a similar manner, the separation process continues row by row with multiple connections between each current span and the row below being logged into the down connection list, and all connections between each current span and the row above being logged into the up list. When the search for the next current span detects no connection to the row below the present current span, it indicates that the segment separation process is complete, i.e., that the current segment of the object has been separated from the binary input image and that the complete segment image is present in the segment array.

During the element by element segment separation process, dimensional data is produced concerning the X and Y dimensions of each element. Accordingly, as each element is separated the X dimension of the object being separated is updated and as each segment is separated the Y dimension of the object being separated is updated so that when object separation is completed the updated X and Y dimensional data is available for object classification purposes.

If it is desired to digitize segment images immediately upon completion of segment separation, the segment image is digitized by well known techniques into a series of X, Y coordinates comprising a segment vector list. The resultant segment vector list is then stored in an object vector list which may contain one or more segment vector lists dependent upon the number of segments that comprise an object image. Since the digitizing process forms no part of the present invention, a detailed description of such processing is not believed necessary, although the lists may be seen on the storage map, FIG. 9.

After the segment image has been digitized, if desired, a logic operation is performed to transfer the segment image to a binary output image array and erase the segment image from the segment array in preparation for receiving the next segment image, if any, of the object being separated.

After transfer of the segment to the output image, a search is made of the down connection list to determine if it indicates an additional segment to be separated. If the list contains more than one entry, the last entry logged is chosen as the next current span and this becomes the initial span of the next segment to be separated. The next and successive segments are separated in a similar manner to that described above with any new encountered connections being added to the connection lists. After each segment separation process is completed, a search is again made of the down connection list to determine if the list contains any other entries.

When no further entries are found in the down list, a search is next made of the up connection list to determine if it indicates any other segment to be separated. If other connections are found, then, as in the case of down connections, the next current span chosen is the last entry logged in the up connection list and this becomes the initial span of the next segment to be separated. The direction of segment separation is now changed and the process of segment separation continues in a manner similar to that described above except that the principal direction of separation is now in the up direction with any new encountered connections being added to the connection lists. When the search for the next current span detects no connection to the current span and no further entries are found in the up or down connection lists, all spans connected to the initial span of the object have been found, and separation of that object is complete.

After an object has been separated, the next step is to classify the object as a recognizable entity, i.e., as alpha-numeric data or as a non-recognizable entity, i.e., as graphic or scrap data. To perform the classification, alphanumeric data may be defined as an object whose dimensions are such as to fit within a square of specified maximum dimension and to exceed a square of specified minimum dimension. Those objects which do not fit within this differential square may be designated as non-recognizable, i.e., if their dimensions exceed the square of maximum dimension they are considered graphic data whereas if their dimension fits within the square of minimum dimension, they are considered scrap data. Thus, classification of objects may be accomplished by a series of comparisons between the object dimensions and dimensions of arbitrarily sized squares. If the object is classified as scrap data the object may be discarded; if classified as graphic data the object vector list may be stored for further processing and if classified as alphanumeric data the object dimensional data and the object itself may be passed to a data processor where the object is analyzed by known character recognition techniques and reduced to a BCD form. Since recognition processing forms no part of the present invention, a detailed description of such processing is not believed necessary.

Following the classification of the object data, a search for the initial span of the next object in the binary input image is begun from the position at which the initial span of the first object was encountered. If that position of the input array is empty, a check is made to determine whether that position is the bottom of the input array. If it is not the bottom, then the search moves in the arbitrarily chosen downward direction until the initial span of the next object in the binary input image is found. When that position is found the program control parameters are initialized; the connection lists are initialized and marked empty; the segment and output arrays are initialized; and the object vector list and object dimensional data are made ready for separating the next object of the binary input image. The position at which the initial span of the next object is encountered is noted and is stored as the minimum vertical dimension of this next object. Following this, the separation process proceeds in the same manner as described above to separate this next object from the binary input image after which a search is again made for the initial span of any other objects in the binary input image. The search continues in a downward direction and if no other objects are detected, then, when the bottom of the input array is reached it is known that all objects in the input array have been separated. If there is no more scan data to be separated, this ends the operation. However, if more scan data is to be separated, then the binary input image array is initialized and the next block of data from the source document is scanned and transferred to fill the input array. The program control parameters are again initialized and the entire process is repeated to separate all object data from the new input image in a manner as described above in connection with the first block of data.

DETAILED DESCRIPTION OF THE SEPARATION PROCESS

Referring now to FIG. 2, there is shown a block diagram of the conversion system for converting randomly interspersed data on a document 100 to digital form in accordance with this invention. The document 100 may, for example, be recorded on microfilm and a scanner 200 of the raster type may operate under control unit 300 to scan the photographic image of the data contained on document 100 in a piece by piece fashion until the entire document is converted to digital form and the interspersed data separated. The control unit 300 is connected via a channel 400 to the central processing unit 500. Under control of the central processing unit 500 a scan data separator 700, in conjunction with main storage 600, analyzes each element for up and down connections as previously described. A control program directs the entire operation.

The film scanner 200 may be of the flying spot CRT type such as the IBM Type 2282 Film Recorder/Scanner operating under control of a control unit 300 such as the IBM Type 2840 Display Control. The control unit 300 may be attached on line to a Data Processing System which includes a channel 400, central processing unit 500 and main storage 600 of the IBM System 360 type disclosed in U.S. Pat. No. 3,400,371 entitled "Data Processing System" filed on Apr. 6, 1964 by G. M. Amdahl et al. and assigned to the same assignee. The scan data separator 700 which performs the object separation process operating in conjunction with the data processing system will be described in greater detail hereinafter as will the control program.

Figure 3:
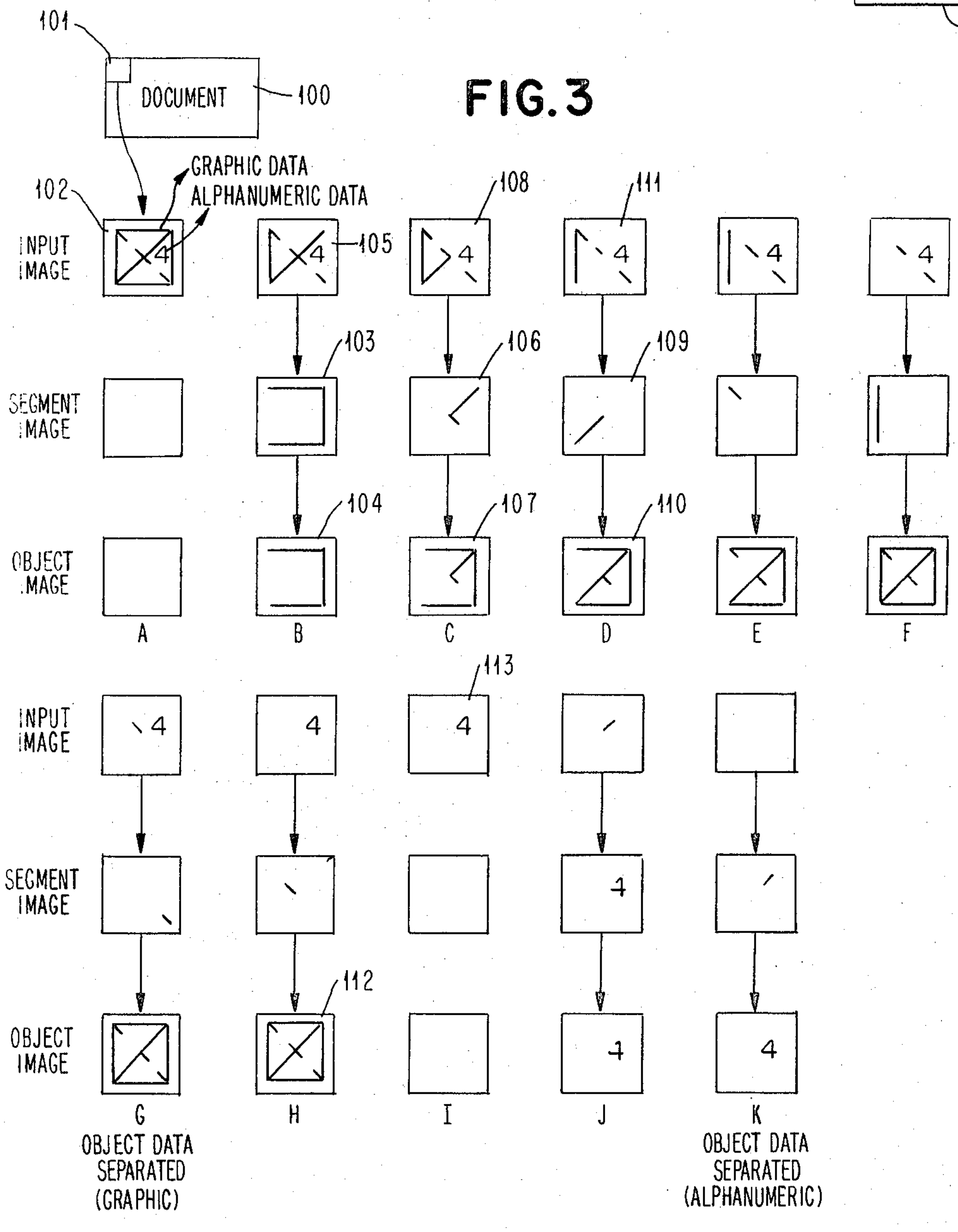
FIG. 3 provides a more detailed illustration of the inventive procedure.

Referring now to FIG. 3, there is shown in simplified diagramatic form the object separation process. In column A a piece 101 of the source document 100 containing interspersed graphic and textural data has been scanned and stored in a binary input array to form a binary input image 102. The segment image and object image arrays in column A are shown in their initialized (empty) condition. According to the separation rules of procedure previously set forth with respect to FIG. 1, the first step is to transfer the first segment from the input image to the segment image, element by element, erasing elements from the input image as each is processed. That first segment is shown in the segment image block of column B at 103. While the first segment image is formed, appropriate information is stored in the up and down connection lists for finding succeeding segments. The first segment image is then transferred to the object image block shown in column B at 104, the segment image block is initialized, and the input image with the erased elements of the first segment is shown in the input image block of column B at 105. The next segment is transferred from the input image to the segment image by utilizing the down connection list according to the rules set out in the procedure defined with respect to FIG. 1. That next segment is shown in the segment image block 106 of column C. During the segment analysis operation, additional entries will be made in the up and down connection lists as new connections are discovered.

The object image block 107 of column C shows the transfer of the first two segments and the input image with erased elements of those two segments is shown in the input image block 108.

The third segment is now reproduced in the segment image block 109 according to the rules set forth with respect to the description of FIG. 1 and is shown in the segment image block of column D. Again, up and down connection lists are updated, the segment is transferred to the object image as shown in the object image block 110 and is erased from the input image as is shown in the input image block 111. The process continues with the fourth segment shown in column E, the fifth segment shown in column F, the sixth segment shown in column G, and the last segment of the first object shown in column H. Once that last segment has been transferred to the object image 112, the input image is left with only a single object present. The first object encompassed all of the graphic data present in the original input image and the second object now shown in the input image block 113 of column I represents all of the alpha-numeric data present in that image. According to the procedures already set forth, that second object is now transferred to an object image as shown in columns J and K.

The result of the above operation has been to transfer all of the information present in the input image to separated object images whereby the objects can be classified into graphic or alphanumeric data. As already set forth, if the object falls within certain boundaries it is catagorized as alphanumeric; if larger, it is graphic and if smaller, it is scrap.

Figure 4A:
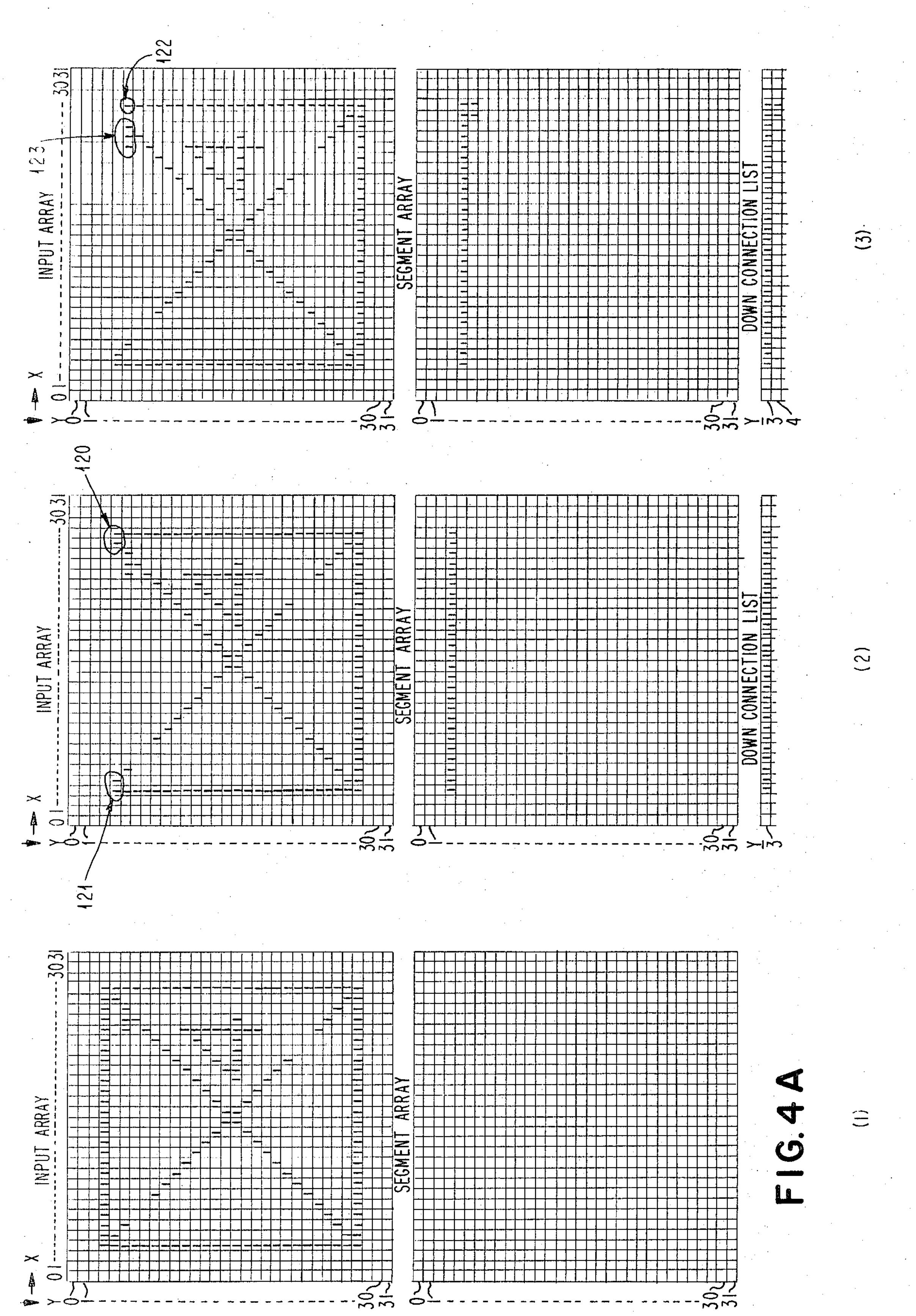
FIGS. 4A–E show a still more detailed illustration of the invention procedure.

A detailed description of the process just described with reference to FIG. 3 is shown in FIGS. 4A–E. Referring first to FIG. 4A, column 1, the input array is shown with the entire input image described within its boundaries; the segment array is empty. According to the rules of procedure which we have arbitrarily chosen, the scan of the input array will begin at Y=0, X=31 and will proceed from right to left across the line Y=0. Finding no one state bits it will then move to Y=1, X=31, and it will proceed from right to left across the line Y=1. Finding no one state bits it will then move to Y=2, X=31. The process is continued until the first one state bit is found which, in this case, is at Y=3, X=28. The line Y=3 is now scanned for a contiguous span of one state bits; finding that span to continue to X=3, one state bits of the segment array in the line Y=3 are placed in the one state condition from X=28 to X=3. That transfer is shown in the segment array in column 2 and the erasure of the initial span in the input array is also shown in column 2. At this point, examination is made for all connecting one state bits in an up and down direction between the element in the segment array, column 2, and the input array, column 2; obviously, since this is the initial span, there are no connecting bits in an upward direction. However, in the downward direction, connecting bits exist at X=28, X=27, X=4 and X=3. The connecting bits at X=28 and X=27 represent a connecting span of one state bits in the next lower row, Y=4, as shown at 120 in column 2, and if it had been the only connecting span, no recordation would have been made in the down connection list. However, the one state bits at X=4 and X=3 represent a second connecting span in the Y=4 row as shown at 121 in column 2, and consequently discovery has been made of multiple downward connecting spans. According to the rules which we have set forth, that fact will be recorded in a down connection list by recording the row containing the current span, i.e., Y=3, and by copying the current span. Therefore, in the down connection list, the current span consisting of Y=3 and X=3–28 is recorded as shown in FIG. 4A, column 2.

The separation process and connection list updating being completed for the first element, the scan will proceed to the rightmost connecting span in Y=4. As previously noted, that span has been found at X=28 and is now transferred from the input array to the segment array as shown in the segment array of column 3. Again, examination is made for all connecting adjacent one state bits in the up and down directions between the element at Y=4 in the segment array, column 3, and the input array, column 3; in this case there are no upward connecting one state bits but downward connecting one state bits are noted at X=28 as shown at 122 and X=26–24 as shown at 123. Since these represent a non-contiguous span of one state bits in the adjacent downward row, there are multiple connections in the downward direction and therefore Y=4 is written into the down connection list together with a copy of the current span. This is shown in the down connection list in column 3.

Figure 4B:
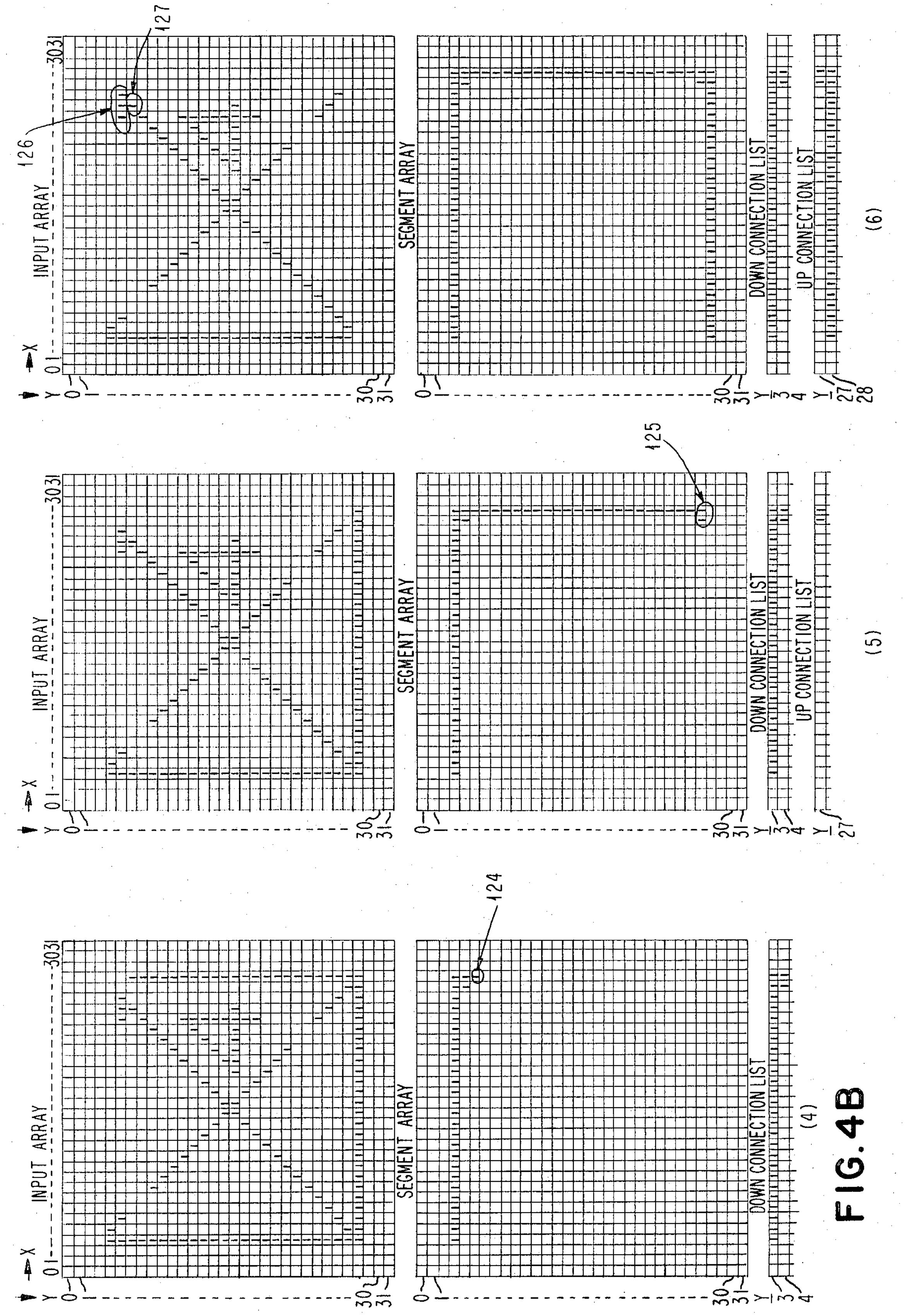
Figure 4C:
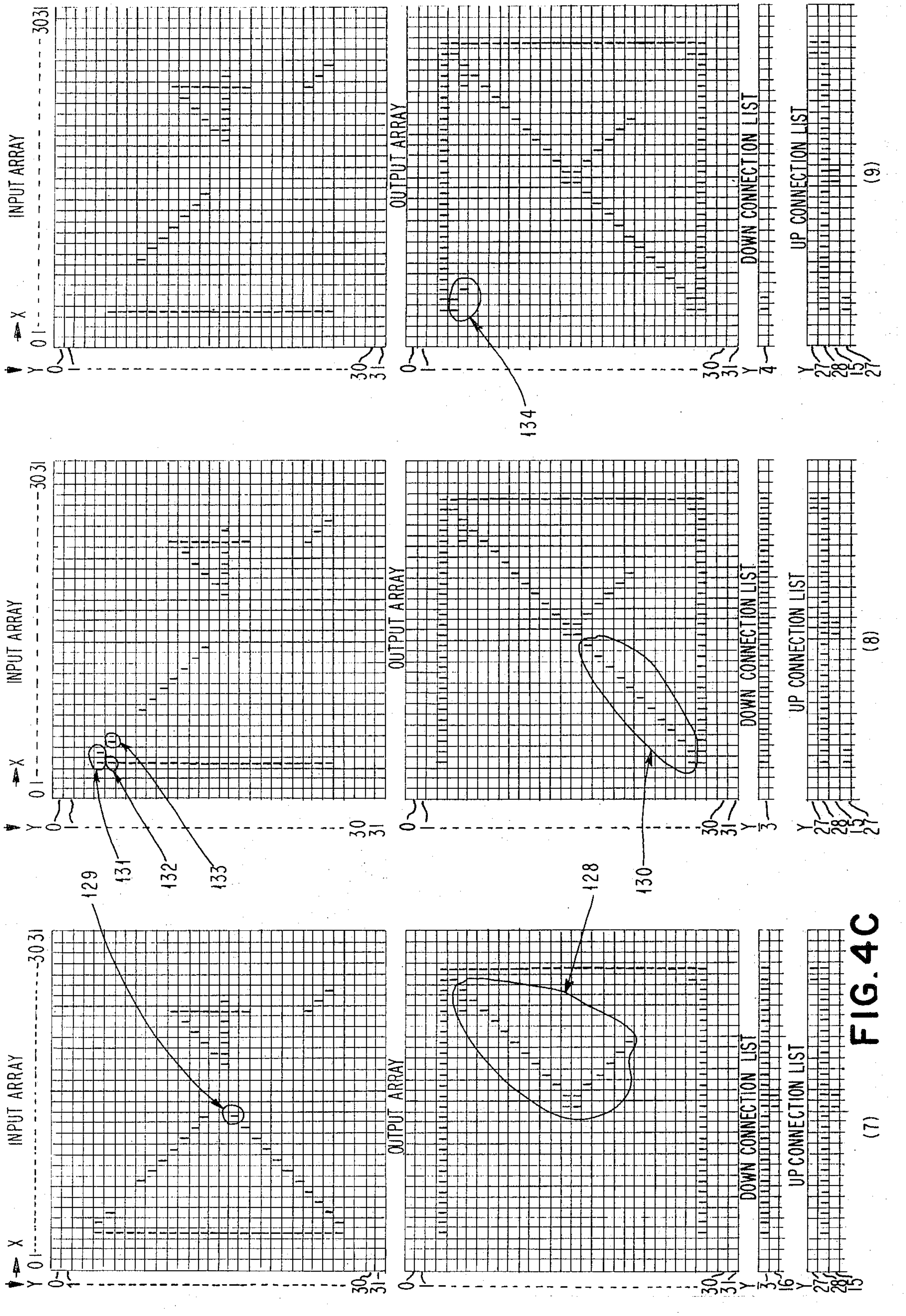
Figure 4D:
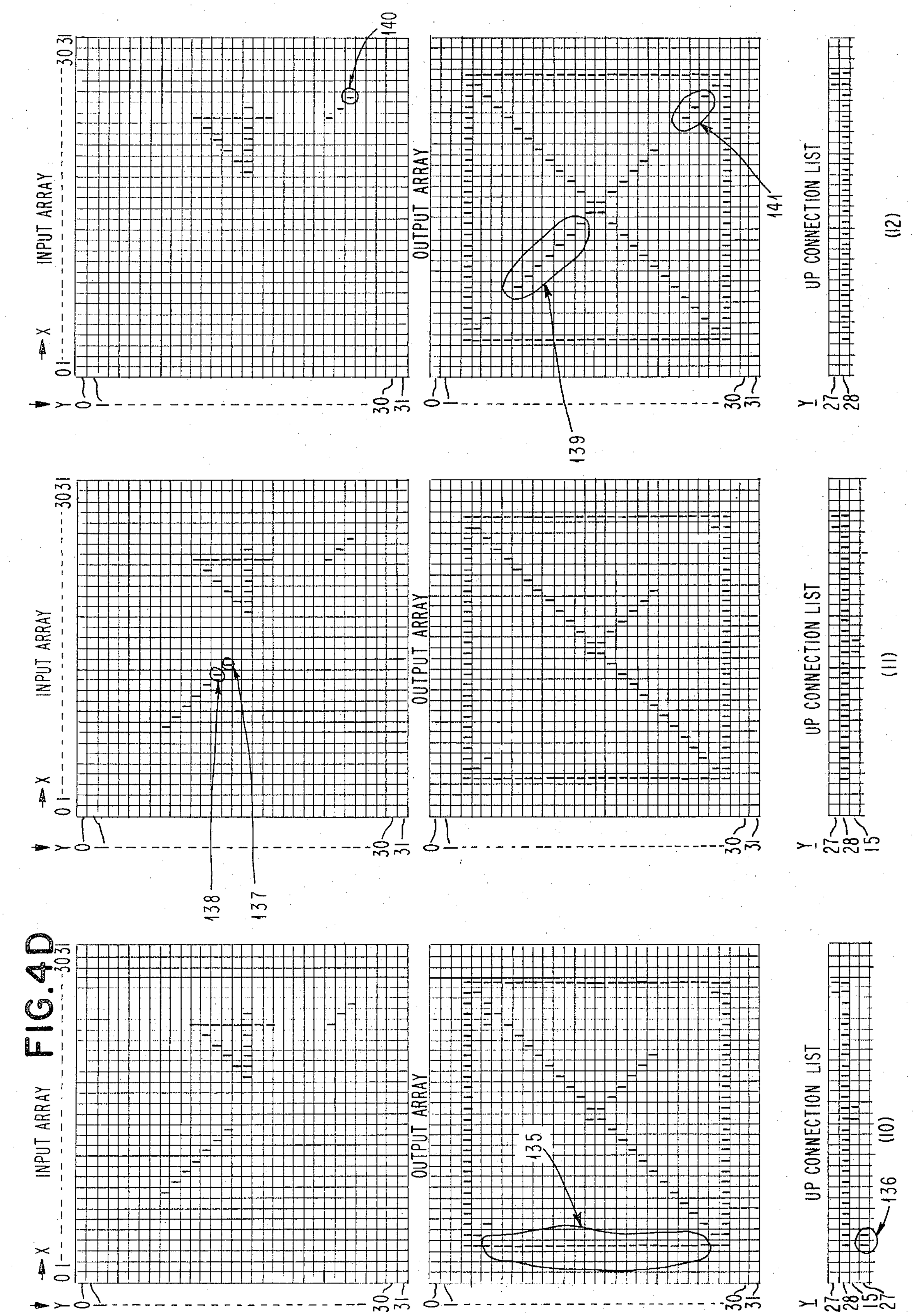
Figure 4E:
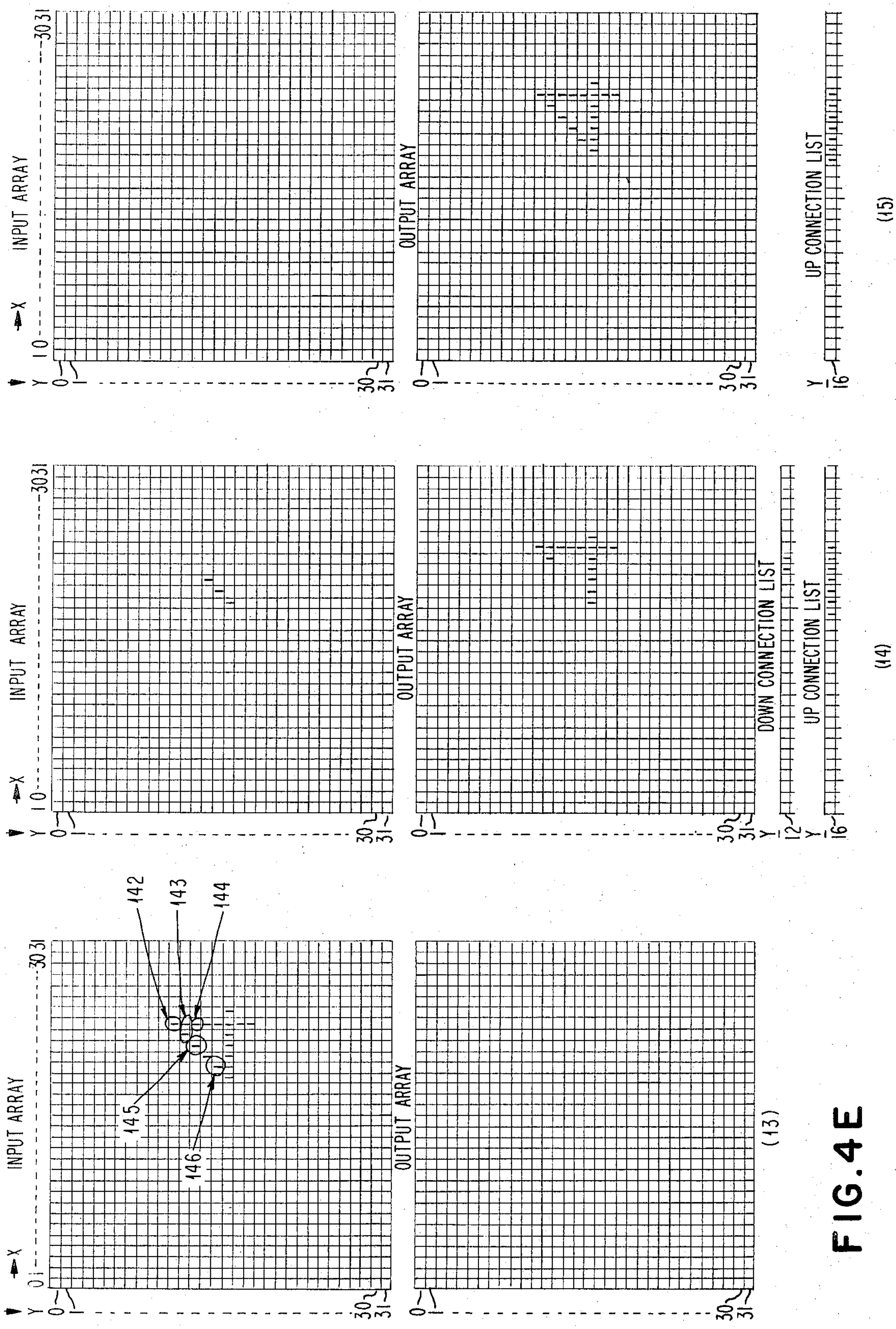

The separation process and connection list procedure for the second element being completed, the scan continues to the rightmost connecting span in the line Y=5. As previously noted, that has been found at X=28 and since there are no connecting one state bits to X=28 along the row Y=5, only that one bit is transferred to the segment array. That is shown in FIG. 4B, column 4, at 124. Upon examination, there are no upwardly connecting bits noted at Y=5 and since there is only one downwardly connecting bit no additional listing is placed in either the up or down connection lists. However, since one downward connection is noted, the scan proceeds to Y=6, X=28 as the next element of the first segment.

The procedure will now continue for each row always finding a downward connecting bit at X=28 until the row Y=27 is reached, at which point there will be two connecting spans, one up and one down as shown by an examination of the element 125 with respect to the input array, column 5. The first entry on the up connection list will be made since the one state bit at Y=26, X=26 provides an adjacent one state bit along an upward diagonal to the bit at Y=27, X=27. The entry is shown in FIG. 4B, column 6. No entry is made in the down connection list because the one state bits noted in row Y=28 are a contiguous span and as such do not represent a multiple connection to be recorded in the down list.

The scan then proceeds to the line Y=28 and all of the one state bits in that line are transferred to the segment array as shown in FIG. 4B, column 6. Upon examination, no down connections are noted but up connections are found at X=3, X=4 as can be seen on the input array, column 6, and consequently the line Y=28 is included in the up connection list of column 6. Since no downward connections were found in the analysis of Y=28, the formation of the first segment in the segment image is now complete, the segment is transferred to the output array, the segment image is initialized in preparation for receiving the next segment image, and a search of the down connection list is commenced. Since the list as shown in FIG. 4B, column 6, contains more than one entry, the last logged entry, Y=4, is chosen as the next current span and becomes the initial span of the next segment to be separated. As may be seen from the input array in column 6, no upward connections will be noted and since only one down connection at 126 is found, no entry is made on either connection list.

The connection list procedure being completed for this first element in the second segment, the scan then proceeds to span 126. Again, no entries are made in either connection list and the scan proceeds to the one downward connecting bit in Y=6 at X=25 shown at span 127, column 6. Analysis of the next line finds a connecting bit at X=24, the next line at X=23, etc. The elements are transferred to the segment array and when the segment is complete, it is transferred to the output array as shown at 128 in FIG. 4C, column 7. In forming this second segment, an additional entry will have been made on the up connection list at the line Y=15 and an additional entry will have been made on the down connection list at the line Y=16 as shown in column 7. Consequently, after the second segment is transferred, the next current span will be taken from the down connection list at Y=16. When it is analyzed, no upward connecting bits will be noted and only one downward connecting bit will be found, that at Y=17, X=14, span 129, column 7.

Successive analysis of connecting spans is now performed according to the procedures already set forth until the segment is complete and is transferred to the output array as shown at 130 in column 8. No new connections will be noted in the down connection list during the processing of this segment but one new up connection entry will be made at Y=27. That is shown in the up connection list of column 8.

The last remaining down connection list entry is now utilized for the next current span, that is, Y=3. it is analyzed and no new entries will be made in either connection list. However, a connecting span will be found at Y=4, X=3, span 131, column 8, that will be written into the segment array and analyzed next. In this case, a multiple connection in the down direction will be noted, span 132 at X=3 and X=5, span 133, and therefore, Y=4 will be written into the down connection list as shown in column 9. The rightmost of these spans, 133, is taken as the next element and after its entry into the segment array, no further connecting bits will be noted. Consequently, the segment 134 will be added to the output array to form the image shown in column 9 of FIG. 4C.

Since a new entry in the down connection list was picked up at Y=4, it becomes the next current span. According to the procedures already set forth, it will be examined for connecting spans and the process will continue with the result that all of the one state bits existing in the column X=3 will be written into the segment array as the next segment of the object. That segment will then be transferred to the object array as shown at 135 in FIG. 4D, column 10. No new entries will be made in either the down or up connection list during the processing of this segment and since no remaining connections exist in the down list, the up list will now be processed beginning with the last entry, Y=27. However, when the element 136 at Y=27 is analyzed and the line Y=26 is examined for upward connecting bits, none will be found since all upwardly connecting bits will have already been written into the output array and erased from the input array as may be seen by comparing the element 136, column 10 with the input array, column 10. Consequently, the processing will end without any further additions to the output array and the next item on the up connection list will become the next current span, that is, Y=15. Y=15 is now analyzed and Y=14 is examined for connecting bits. One is found at X=14 span 137, column 11, and is written into the segment array. The next successive higher line is scanned, a connecting bit is found at X=13, span 138, column 11, and is written into the segment array. Eventually, the segment is completed and is transferred to the output array as shown at 139 in column 12.

The up connection list is again examined and line Y=28 becomes the next current span. It is analyzed with the line Y=27 for connecting bits but none are found since all have already been erased from the input array and transferred to the output array as may be seen in column 12.

The up connection list is again examined and line Y=27 is analyzed as the next current span. A connecting bit is found at Y=26, X=27, span 140. Successive scans are continued in an upward direction until all connecting bits are transferred to the segment array and erased from the input array. The result is shown at 141 in the output array in column 12. At this point, the up and down connection lists are both empty indicating that the first object has been completely transferred. The output array is now transferred to the object image and is initialized to zero as shown in column 13 of FIG. 4E. The transfer of the next object in the input array begins. In our example, there is only one object left in the input array and that is shown in column 13 as the alphanumeric figure 4.

According to the arbitrary rules chosen herein, the scan of the input array will begin at Y=3, X=31 and proceed from right to left. Successive scans of horizontal lines are accomplished without finding a one state bit until the line Y=11 is found where a one state bit is noted at X=24, span 142. That one bit, being the only connecting one state bit in Y=11, will be transferred to the segment array and an examination will be made for up and down list entries. None will be noted but one connecting span in the line Y=12 will be found beginning at X=24, span 143. This element will be written into the segment array and will comprise one state bits at X=24 and X=23. It is analyzed and although no entries will be found for the up connection list, multiple entries for the down connection list will be noted at X=24, span 144, and at X=22, span 145. As a result, the line Y=12 is written into the down connection list before moving on to span 144 as the next element in the segment. When Y=12 is analyzed, no new entries will be made in the down or up connection lists but the next span will be found at line Y=13, X=24. The process will continue until the first segment is completely written as shown in the output array in column 14. An entry in the up connection list will have been made at Y=16 for the upwardly connecting span 146 in line Y=15, X=20.

Next the down connection list is examined and the line Y=12 is taken as the next current span. It is analyzed and a connecting bit is found in the next lower line to be written into the segment array. In succeeding analysis steps, all downwardly connecting one state bits are entered in the segment array with the result that all of the remaining one state bits in the alphanumeric figure 4 will be transferred to the output array and erased from the input array as shown in column 15.

At this point, the up connection list is examined at the line Y=16. However, since all upwardly connecting bits will have already been written into the output array and erased from the input array, no connecting bits will be found and the processing of the object will be complete. The alphanumeric figure 4 is now transferred to its object image storage location and since a new scan of the input image will find no additional objects, the separation process for the scan portion 101 is complete.

DESCRIPTION OF THE SCAN DATA SEPARATOR

As pointed out with reference to FIG. 2, the scan data separator 700 operates under control of the central processing unit 500 in conjunction with main storage 600 to perform the connectivity tests described in general with reference to FIGS. 1, 3 and 4. A detailed description of the manner in which the connectivity tests are made will now be described utilizing the circuits shown in FIGS. 5A–D.

Referring to FIGS. 5A–D, it may be observed that the scan data separator is basically comprised of a group of registers together with transfer controls, input gates and counters. Registers A and F are shown on FIG. 5A, registers B and C on FIG. 5B, register D on FIG. 5C and register I together with the counters on FIG. 5D. An explanation of the operation of these circuits will be given in functional sequence utilizing the timing charts shown in FIGS. 6 and 7. The data to be processed in this explanation will be the input image illustrated in FIG. 4A, column 1.

Figure 6:
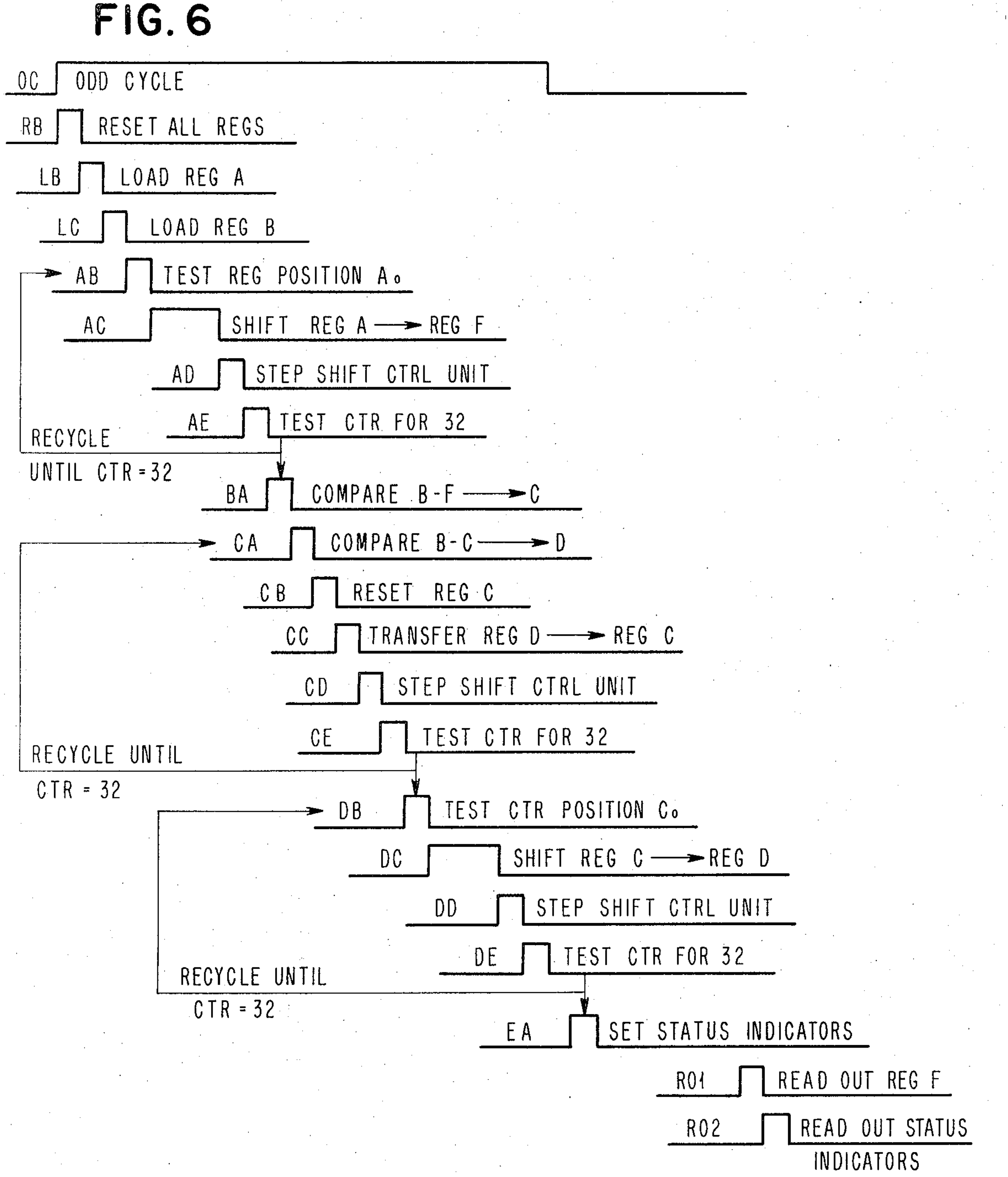
FIGS. 6 and 7 are timing pulse charts for initiation of sequential steps in operation of the scan data separator.
Figure 7:
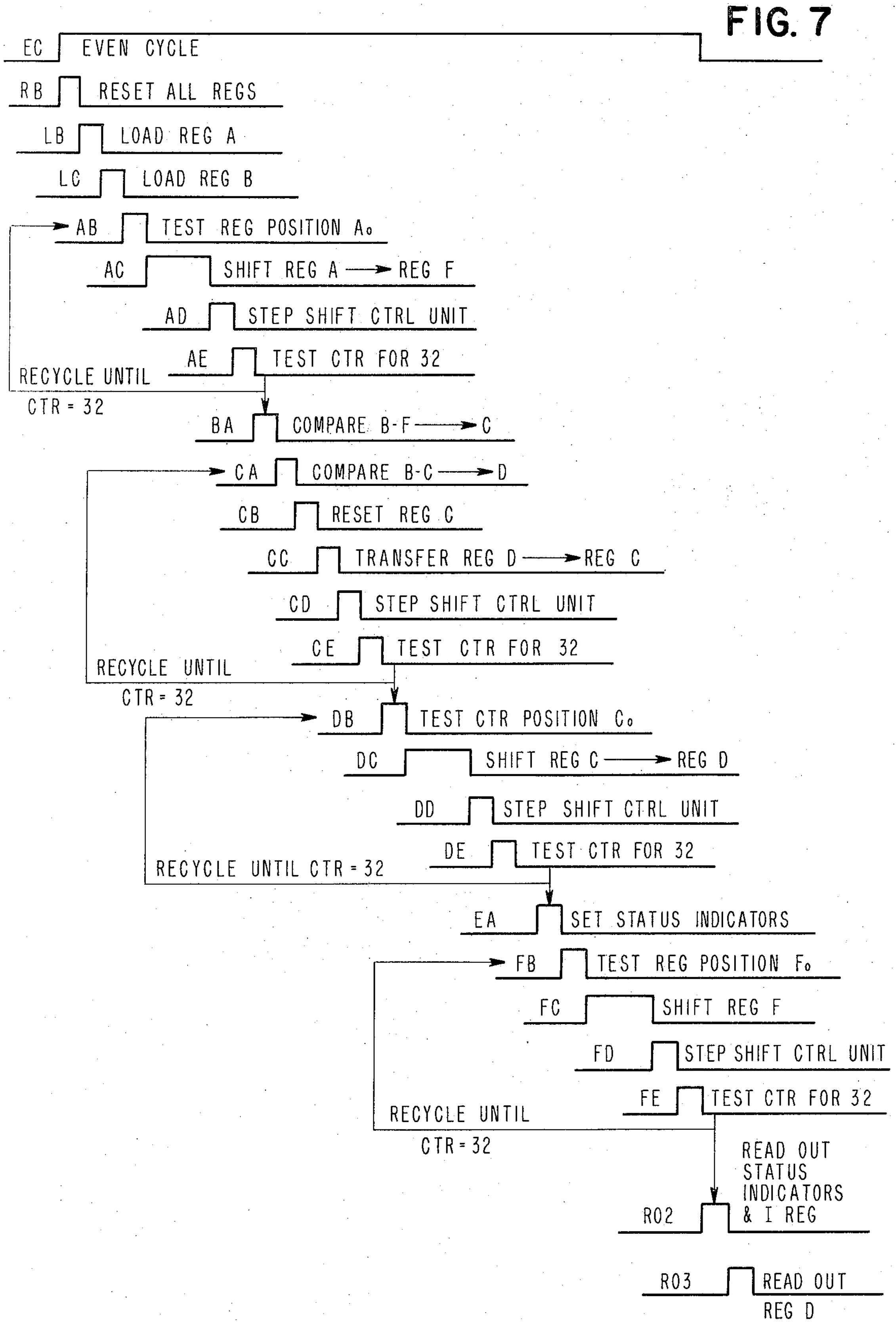

The first pulse, RB, on the timing chart shown in FIG. 6 is a clearing pulse for the latch circuits of the various registers. The second pulse, designated LB, is designed to prime the input gates 701 of register A so that is can be loaded. Loading will occur for the first time in our example after the first one state bit is encountered in the scan of the input array, and as has been pointed out, that will occur at Y=3 and X=28. An input pulse on the data bus 702 indicates the presence of a one state bit in Y=3 and provides means to set the corresponding latch in the A register. For example, latch L3 will be set on for bit X=28.

Figure 5A:
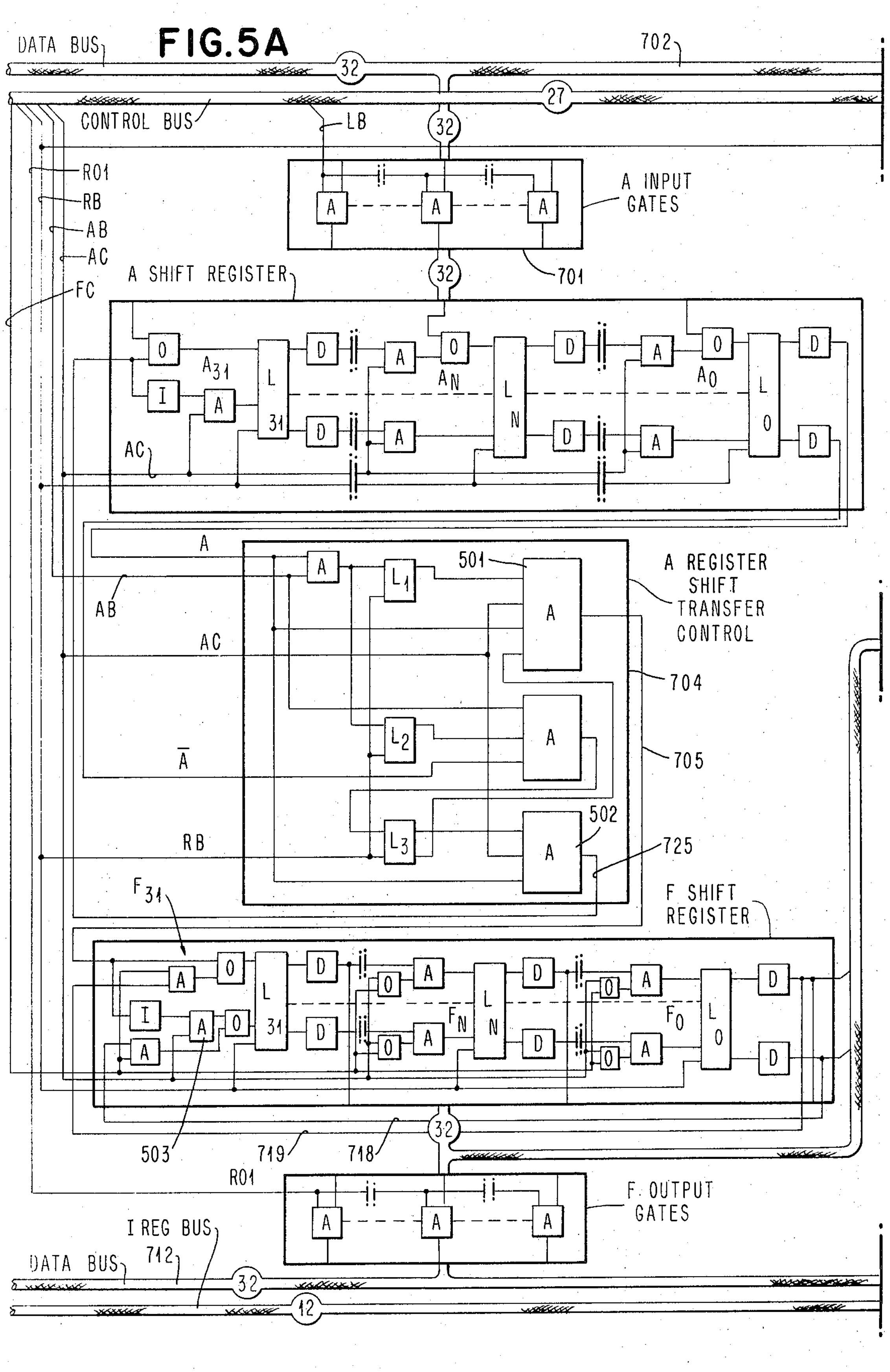
FIGS. 5A–E are a logic circuit diagram of the scan data separator.
Figure 5B:
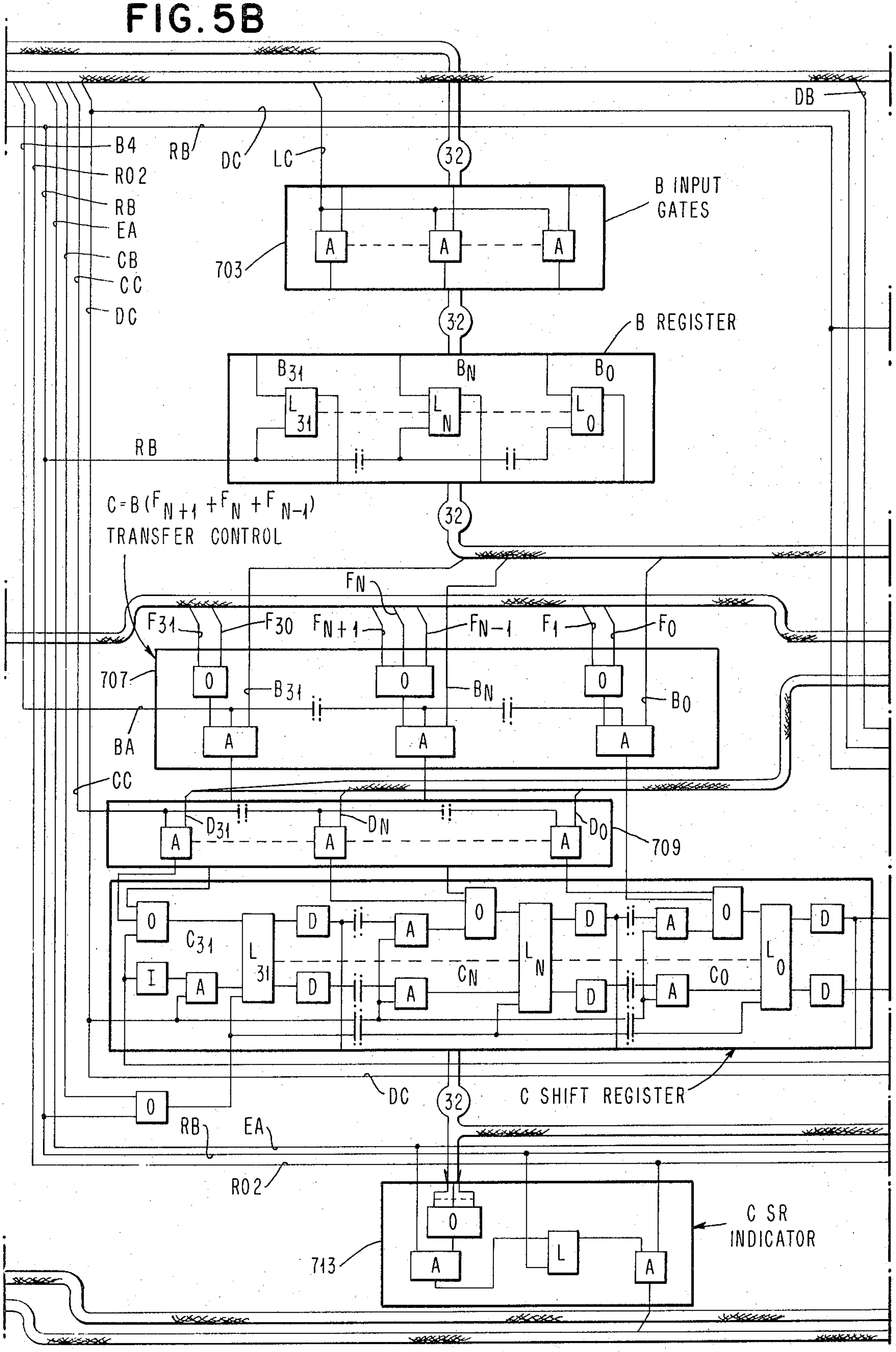

To perform upward connectivity tests, the line Y=2 is now loaded into register B, FIG. 5B, by generating a timing pulse LC to prime the AND gates in the B input gate 703 and simultaneously cause the scanner to scan the line Y=2 to provide input data over the data bus in order to set appropriate latches in the B register.

Referring again to FIG. 6, the next timing pulse is the AB pulse which is fed into the A register shift transfer control 704 in FIG. 5A. In our example, transfer of Y=3 into the A register has resulted in a zero state bit in the position L0 of the A register. Consequently, the occurrence of the AB timing bit will cause a transfer of zero bit information to the F shift register through line 705. The occurrence of the AC timing pulse will cause the A register to shift one place moving the L1 bit into the L0 position. The AD timing pulse is now issued as is illustrated in FIG. 5D and causes the binary counter 706 to be stepped by one, thus indicating that a shift of one bit has now occurred. The timing pulse AE is next issued and is also illustrated in FIG. 5D to provide a test of the count to determine whether it has reached 32. If it has not, which is the case at this point in our example, pulse AB will again be issued in a recycling operation apparent on the timing chart in FIG. 6.

The next issuance of timing pulse AB will result in no significant change since the original L1 bit which has now been moved to L0 is also a zero state bit. The procedure will continue in the manner previously described until the original L3 bit has been shifted into the L0 position. The original L3 bit represents the one state bit at X=28 and is the first one state bit encountered in the line Y=3. Now upon the occurrence of the AB timing pulse, the latch L1 in the transfer control 704 will be set. Upon the occurrence of timing pulse AC, the transfer control 704 will provide an output through line 705 to latch L31 in the F shift register setting L31 on and simultaneously will provide a shift one position movement in the A register. Timing pulses AD and AE will be issued for count and test purposes as before described and since the count in counter 706 will now be at 3, the timing pulse AB will again be issued. In our example, there will be encountered a succession of one state bits all of which will be successively transferred into latch L31 of the F shift register with the preceding one state bits in the F register being shifted down the line until the shift reaches X=2.

Upon the occurrence of the A1 pulse when X=2, there will be no A pulse since there will be a zero state bit in the L0 position of the A register. However, latch L2 in the transfer control 704 will be set on and as a result, latch L3 will be set; the purpose of L2 and L3 will be described below. Continuing through the next two cycles, additional zeros will be provided to the F shift register with the result that a copy of the line Y=3 will now exist in the F shift register, while the A register in this case will have been zeroed out. Also, the occurrence of the 32nd AD pulse will create a count of 32 in the binary counter and upon the occurrence of timing pulse AE, an output will be produced which resets the binary counter 706 to zero and provides information to the timing unit so that the next pulse to be issued will be the BA pulse rather than recycling back to the AB pulse.

At this point it is desirable to digress from the sequential operation of our example in order to explain the significance of the latches L2 and L3 in transfer control 704. To do that, consider that the line under analysis is Y=4 rather than Y=3. In that case, processing would be as previously described through the entire line until the position X=4 when a one state bit will be shifted into the L0 position of the A register. Now, upon the occurrence of the next AC pulse, there will not be a transfer of a one state bit to the F register because the L3 input pulse to the transfer control output AND circuit 501 will be missing. However, the A register will be shifted through the output AND circuit 502, and the F register will be shifted through AND circuit 503. The procedure will be continued until the count reaches 32 with the A and F registers being stepped regardless of whether a one or a zero state bit is being analyzed in position L0. Thus, it is apparent that only the rightmost set of one state bits in the line under analysis is transferred from register A to register F. Feedback from AND circuit 502 over line 725 to register A provides a copy of line Y=4 in the A register with the rightmost set of one state bits removed.

Continuing with the sequential analysis of line Y=3, referring to FIG. 6, the next control pulse to be issued is the BA pulse which primes the AND gates in the C register transfer control 707 as may be noted in FIG. 5B. The provision of the BA pulse causes any one state bit in the B register to be duplicated in a corresponding C register position if an adjacent bit (vertical or diagonal) in the F register is also in a one state condition. Consequently, for the B0 position, should any of the F0 or F1 position bits be in the one state, the C0 position will also be placed in a one state, At an intermediate position, for example, at B1, if the B1 bit is in the one state and if any of the F0, F1 or F2 bits are in the one state, the B1 bit will be duplicated in the C1 position. Mathematically, the operation being performed may be expressed by $C=B(F_{N+1} + F_N + F_{N-1})$ where C, B and F designate registers and N represents register position. This operation is a test of connectivity between the rightmost set of one state bits in the Y=3 line and the Y=2 line. In our example, we know that the Y=2 lines is all zeros and therefore, the resultant information in the C register will be a succession of zeros. Had a one state bit existed in the line Y=2 and had that one state bit been adjacent to one state bits in the rightmost element of the line Y=3, the fact of that connectivity would now be present in the C register at the position of the one state bit in the line Y=2, as may be seen from the above mathematical expression.

On the following timing pulse, CA, the AND gates of the D register transfer control 708 are primed and cause a passing of any one state bits in the C register into the D register. The result is a duplication in the D register of the connectivity indications in the C register. The next timing pulse, CB, is issued to clear the C register.

The CC pulse is then issued to the input AND gates 709 of the C register causing a duplication of the D register information in the C register.

The CD pulse is then issued to step the binary counter in FIG. 5D. The CE pulse tests the counter 706 to see whether it has reached a count of 32. Since it has not reached such a count at this point, a recycling through the pulses CA through CE is undertaken.

Figure 5C:
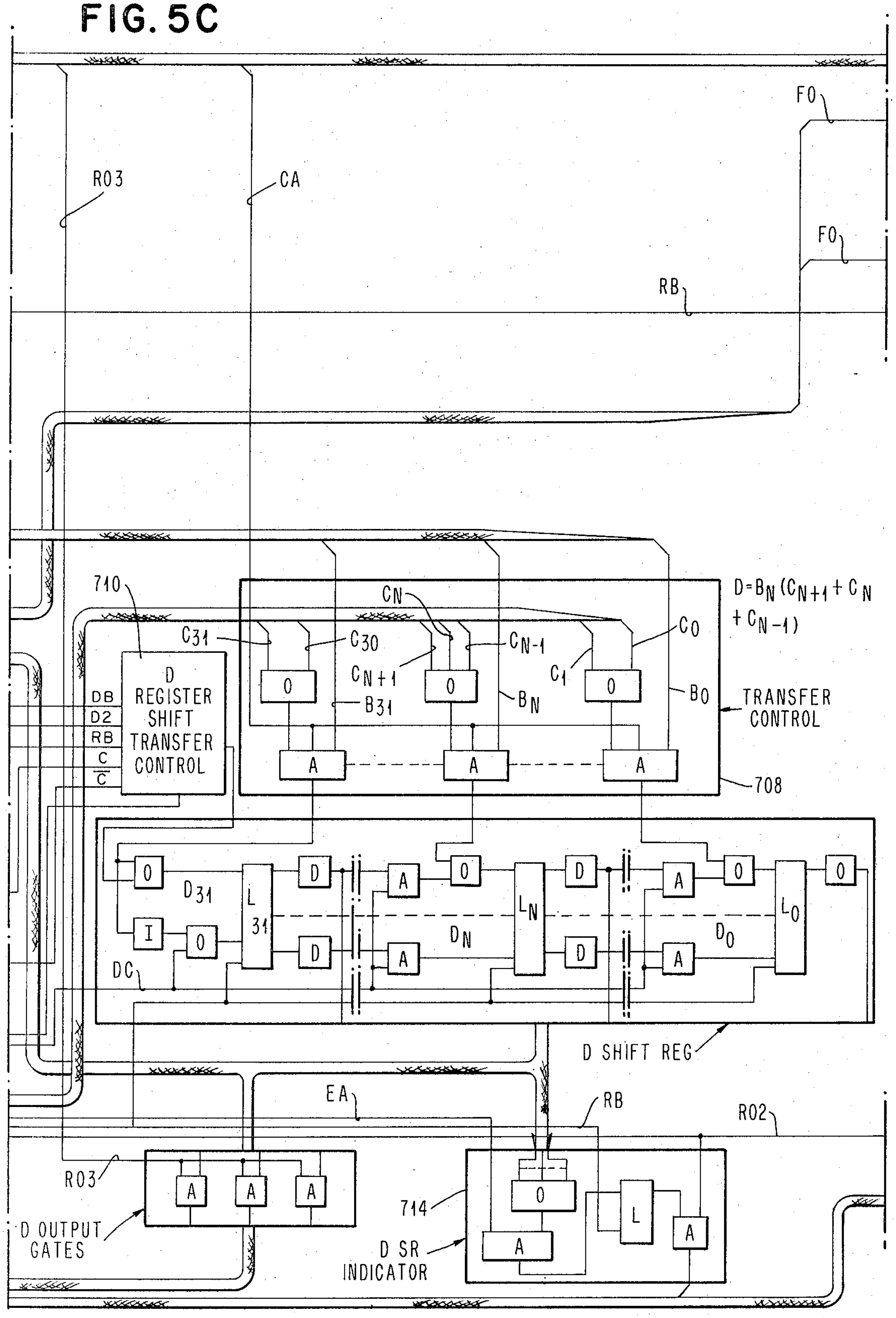
Figures 5D, 5E:
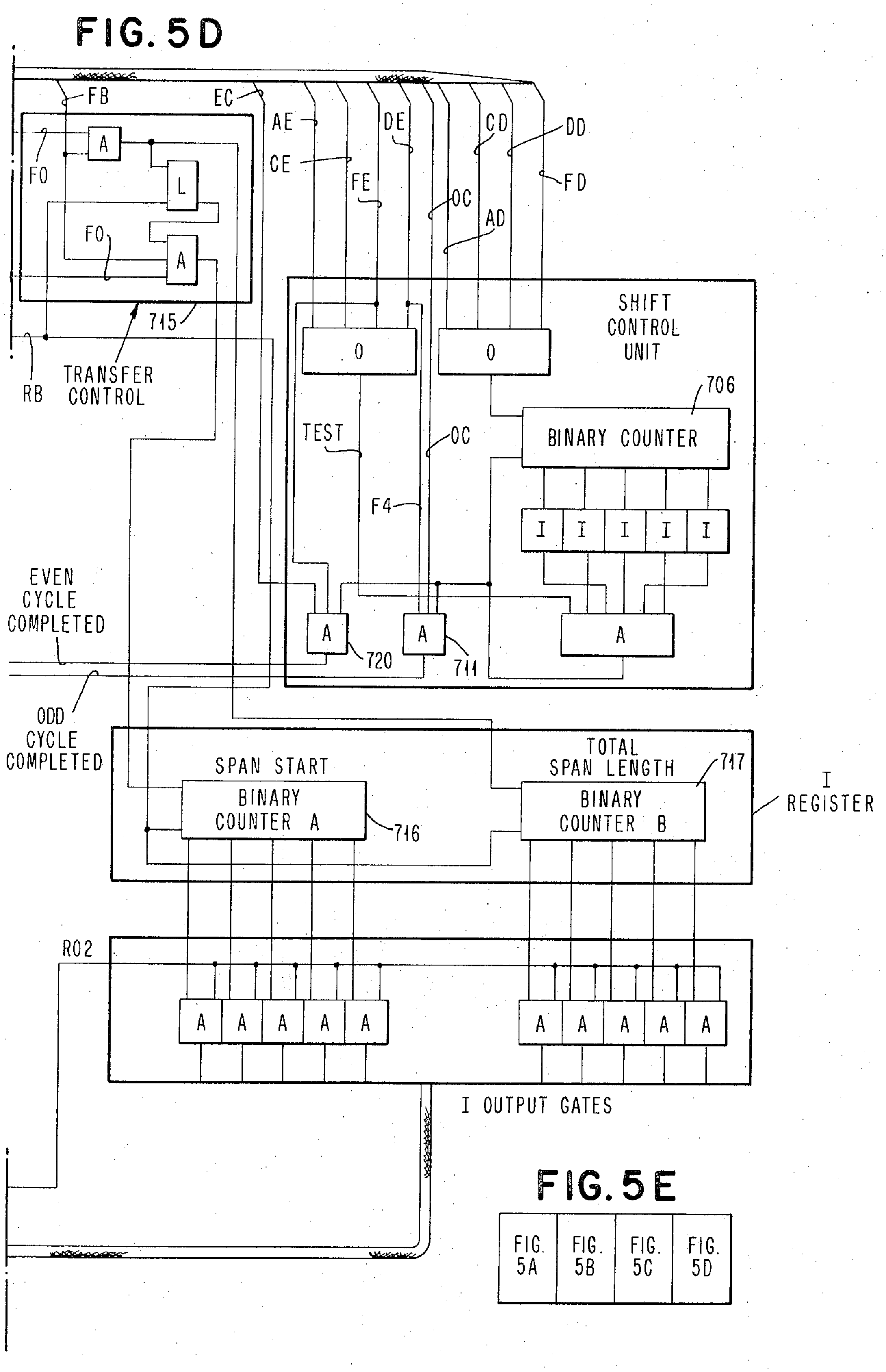

After the count reaches 32, the next timing pulse DB is issued and, as may be noted on FIG. 5C, it operates on the D register shift transfer control 710 in a manner similar to the test pulse AB on the A register transfer control 704. It should be noted at this point that the circuit upon which the DB pulse operates is not shown in detail since it is a duplication of the A register transfer control 704 shown in FIG. 5A. The result of the operation of the DB and DC pulses is the same as the operation of the AB and AC pulses and therefore, no detailed description of these operations is again necessary. The result of these operations is to shift the rightmost block of one state bits from register C to register D. Timing pulses DD and DE are issued in sequence to step the counter 706 and to test for 32 steps. At the close of the DB–DE recycling operation, register D will contain only the rightmost set of connectivity indicator bits while register C will contain all other sets of connectivity bits in an upward direction from the rightmost element in the line Y=3. Thus, register D indicates the presence of at least one connecting element and its location while register C indicates the presence of multiple connections and their location. At this point in our example, both registers will contain 32 zeros. It may be observed that the concurrence of a count of 32 with the OC and DE pulses will indicate that this cycle (an odd cycle) has been completed. See AND circuit 711.

The pulse EA is next issued and, as shown in FIG. 5B, coacts with any one state bits that are now in the C and D registers to provide an indication that connectivity exists in the upward direction and that an entry should be made into the up connection list.

The next timing pulse issued is the R01 pulse which is shown on FIG. 5A to prime the F register output gates and cause the contents of the F register to be read out into data bus 712. The F register contains the rightmost block of ones from the line Y=3, i.e., the current span, and will be used in the next sequence to load the A register for a check of downward connectivity.

The R02 timing pulse is issued to read out the contents of the status indicators 713 and 714 for the C and D registers respectively in order to indicate whether an up connection exists for the first element of the line Y=3.

For a complete scan of the first element, two cycles of the scan data separator are necessary. The first of these two cycles, the odd cycle, has just been described and was seen to examine the current span for upward connectivity. Now, the even cycle illustrated in FIG. 7 will be described to examine the current span for downward connectivity.

The even cycle begins as did the odd cycle with the issuance of an RB timing pulse to reset all registers and an LB pulse to load register A. At this time, CPU 500 will load the preserved contents of the F register rather than data bits from the line Y=3, since the F register contains the rightmost element in the line Y=3.

The second pulse is the LC pulse which loads register B with the contents of the line Y=4. Consequently, it is clear that the testing to be undergone in the even cycle is for the connectivity between the rightmost element of the line Y=3 and the line beneath it, Y=4.

The next pulse issued is the AB pulse which tests register position $A_0$ in the manner already explained in the odd cycle. The sequence of pulses to follow, A2, A3 and A4, also perform exactly the same functions as previously described with reference to the odd cycle.

Next a BA pulse is issued to compare registers B and F and place the contents in register C again as previously described. Following the BA pulse, the CA, CB, CC, CD and CE set of pulses are issued which again perform exactly the same functions as in the odd cycle, that is, to compare registers B and C, to place the contents of that comparison in D, to reset register C, to write register D into register C, to step the counter 706 and to test the counter for the count of 32.

The DB, DC, DD and DE timing pulses are now issued in sequence to perform exactly the same functions as already described with reference to the odd cycle, i.e., to record the rightmost downward connection in register D and all other downward connections in register C.

The EA pulse is issued to set the status indicators in preparation for a read-out of the presence or absence of downward connectivity in the C and D registers. Since the presence of one state bits in the C register will indicate multiple connectivity in the downward direction, an on condition in the C register status indicator will show that status. The presence of one state bits in the D register indicate the next element to be examined.

The following timing pulse is designated FB and will test the register position F0 for the presence of a one state bit as shown in FIG. 5D, transfer control 715. It will be noted that pulse FB also starts the span start binary counter 716 and the total span length counter 717 in the I register. The issuance of the next timing pulse FC will shift the contents of the F register by one bit. By recycling 32 times, the resulting shift of 32 bits will give the location of the start of one state bits and the total span length in the two I register counters. The contents of the F shift register are preserved during the shift by transferring the F register L0 position bit to the F register L31 position bit over lines 718 and 719 as shown in FIG. 5A and propagating it down the line of latch positions until after 32 shifts the F register will be in the same condition as it was at the beginning. The FD and FE pulses are stepping and testing pulses similar to the AD and AE pulses already described. The concurrence of the 32nd bit count in 706 with the FE and EC pulses satisfies AND circuit 720 and provides an indication to the CPU that the even cycle has been completed.

An R02 timing pulse is next issued to read out the status indicators 713 and 714 so that proper procedures can be initiated to store the current span of line Y=3 and the designation of that line in appropriate storage locations for the down connection list. The R02 pulse also reads out the span start, counter 716, and total span length, counter 717, present in the I register.

Finally, an R03 pulse is issued to read out the contents of register D to provide the rightmost block of ones in the line Y=4 as the next current span for the operation of the next odd cycle of instructions.

The odd cycle of instructions illustrated in FIG. 6 is again repeated; however, upon the issuance of the timing pulse LB, register A will not be loaded with a scan of the line Y=3, but rather with the rightmost block of ones from the line Y=4 which were isolated in register D during the even cycle as above described. The issuance of the LC timing pulse will cause the line Y=3 to be loaded into register B with, however, the rightmost block of ones erased from it. Processing in the scan data separator now continues as before through odd and even cycles until the entire segment image has been prepared together with appropriate designations in the up and down connection lists. Although a verbal description of the continued processing of our example would be repetitious, a set of tables follows which shows the contents of the registers in the scan data separator throughout the first few cycles of segment separation so that those skilled in the art may have further reference for their continued analysis of the manner in which the scan data separator functions.

TABLE 1.—FIRST ODD CYCLE. Y = 3

| | | |
|---|---|---|
| A | 00011111111111111111111111111000 | LOAD A FROM Y = 3 |
| B | 00000000000000000000000000000000 | LOAD B FROM Y = 2 |
| C | 00000000000000000000000000000000 | |
| D | 00000000000000000000000000000000 | |
| F | 00000000000000000000000000000000 | |
| | | |
| A | 00000000000000000000000000000000 | SHIFT A (32X) TO TRANSFER RIGHT |
| B | 00000000000000000000000000000000 | MOST BLOCK OF 1's FROM A TO F |
| C | 00000000000000000000000000000000 | |
| D | 00000000000000000000000000000000 | |
| F | 00011111111111111111111111111000 | |
| | | |
| A | 00000000000000000000000000000000 | |
| B | 00000000000000000000000000000000 | $C_X = B_X(F_{X+1} + F_X + F_{X-1})$ |
| C | 00000000000000000000000000000000 | $D_X = B_X(C_{X+1} + C_X + C_{X-1})$ |
| D | 00000000000000000000000000000000 | THEN RESET C REPEAT 32X |
| F | 00011111111111111111111111111000 | THEN TRANSFER D TO C |
| | | |
| A | 00000000000000000000000000000000 | |
| B | 00000000000000000000000000000000 | |
| C | 00000000000000000000000000000000 | SHIFT C (32X) TO TRANSFER RIGHT |
| D | 00000000000000000000000000000000 | MOST BLOCK OF 1's FROM C TO D |
| F | 00011111111111111111111111111000 | |
| | | |
| A | 00000000000000000000000000000000 | |
| B | 00000000000000000000000000000000 | |
| C | 00000000000000000000000000000000 | C INDICATOR BIT = 0 |
| D | 00000000000000000000000000000000 | D INDICATOR BIT = 0 |
| F | 00011111111111111111111111111000 | |

TABLE 2.—FIRST EVEN CYCLE. Y = 3

| | | |
|---|---|---|
| A | 00011111111111111111111111111000 | LOAD A FROM F (RIGHT MOST BLOCK OF 1's FROM Y = 3) |
| B | 00011000000000000000000000011000 | LOAD B FROM Y = 4 |
| C | 00000000000000000000000000000000 | |
| D | 00000000000000000000000000000000 | |
| F | 00000000000000000000000000000000 | |
| | | |
| A | 00000000000000000000000000000000 | SHIFT A (32X) TO TRANSFER RIGHT |
| B | 00011000000000000000000000011000 | MOST BLOCK OF 1's FROM A TO F |
| C | 00000000000000000000000000000000 | |
| D | 00000000000000000000000000000000 | |
| F | 00011111111111111111111111111000 | |

Table II – Continued

| | | |
|---|---|---|
| A | 00000000000000000000000000000000 | |
| B | 00011000000000000000000000011000 | $C_X = B_X(F_{X+1} + F_X + F_{X-1})$ |
| C | 00011000000000000000000000011000 | $D_X = B_X(C_{X+1} + C_X + C_{X-1})$ |
| D | 00011000000000000000000000011000 | THEN RESET C REPEAT 32X |
| F | 00011111111111111111111111111000 | THEN TRANSFER D TO C |
| | | |
| A | 00000000000000000000000000000000 | |
| B | 00011000000000000000000000011000 | |
| C | 00011000000000000000000000000000 | SHIFT C (32X) TO TRANSFER RIGHT |
| D | 00000000000000000000000000011000 | MOST BLOCK OF 1's FROM C TO D |
| F | 00011111111111111111111111111000 | |
| | | |
| A | 00000000000000000000000000000000 | C INDICATOR BIT = 1 |
| B | 00011000000000000000000000011000 | D INDICATOR BIT = 1 |
| C | 00011000000000000000000000000000 | SET SPAN START X = 00011(3) |
| D | 00000000000000000000000000011000 | AND SET TOTAL SPAN LENGTH |
| F | 00011111111111111111111111111000 | ΔX = 11010(26) |

TABLE 3. – SECOND ODD CYCLE, Y = 4

| | | |
|---|---|---|
| A | 00000000000000000000000000011000 | LOAD A FROM D (RIGHT MOST BLOCK OF 1's FROM Y = 4) |
| B | 00000000000000000000000000000000 | LOAD B FROM Y=3 (WITH RIGHT MOST ELEMENT ERASED) |
| C | 00000000000000000000000000000000 | |
| D | 00000000000000000000000000000000 | |
| F | 00000000000000000000000000000000 | |
| | | |
| A | 00000000000000000000000000000000 | SHIFT A (32X) TO TRANSFER RIGHT |
| B | 00000000000000000000000000000000 | MOST BLOCK OF 1's FROM A TO F |
| C | 00000000000000000000000000000000 | |
| D | 00000000000000000000000000000000 | |
| F | 00000000000000000000000000011000 | |
| | | |
| A | 00000000000000000000000000000000 | |
| B | 00000000000000000000000000000000 | $C_X = B_X(F_{X+1} + F_{X-1})$ |
| C | 00000000000000000000000000000000 | $D_X = B_X(C_{X+1} + C_X + C_{X-1})$ |
| D | 00000000000000000000000000000000 | THEN RESET C REPEAT 32X |
| F | 00000000000000000000000000011000 | THEN TRANSFER D TO C |
| | | |
| A | 00000000000000000000000000000000 | |
| B | 00000000000000000000000000000000 | |
| C | 00000000000000000000000000000000 | SHIFT C (32X) TO TRANSFER RIGHT |
| D | 00000000000000000000000000000000 | MOST BLOCK OF 1's FROM C TO D |
| F | 00000000000000000000000000011000 | |
| | | |
| A | 00000000000000000000000000000000 | |
| B | 00000000000000000000000000000000 | |
| C | 00000000000000000000000000000000 | C INDICATOR BIT = 0 |
| D | 00000000000000000000000000000000 | D INDICATOR BIT = 0 |
| F | 00000000000000000000000000011000 | |

TABLE 4. – SECOND EVEN CYCLE, Y = 4

| | | |
|---|---|---|
| A | 00000000000000000000000000011000 | LOAD A FROM F (RIGHT MOST BLOCK OF 1's FROM Y = 4) |
| B | 00010100000000000000000011101000 | LOAD B FROM Y = 5 |
| C | 00000000000000000000000000000000 | |
| D | 00000000000000000000000000000000 | |
| F | 00000000000000000000000000000000 | |
| | | |
| A | 00000000000000000000000000000000 | SHIFT A (32X) TO TRANSFER RIGHT |
| B | 00010100000000000000000011101000 | MOST BLOCK OF 1's FROM A TO F |
| C | 00000000000000000000000000000000 | |
| D | 00000000000000000000000000000000 | |
| F | 00000000000000000000000000011000 | |
| | | |
| A | 00000000000000000000000000000000 | |
| B | 00010100000000000000000011101000 | $C_X = B_X(F_{X+1} + F_X + F_{X-1})$ |
| C | 00000000000000000000000000101000 | $D_X = B_X(C_{X+1} + C_X + C_{X-1})$ |
| D | 00000000000000000000000001101000 | THEN RESET C 1st OF 32 CYCLES |
| F | 00000000000000000000000000011000 | |
| | | |
| C | 00000000000000000000000001101000 | TRANSFER D TO C |
| D | 00000000000000000000000001101000 | |
| | | |
| A | 00000000000000000000000000000000 | |
| B | 00010100000000000000000011101000 | |
| C | 00000000000000000000000001101000 | $D_X = B_X(C_{X-1} + C_X + C_{X-1})$ |
| D | 00000000000000000000000011101000 | THEN RESET C 2nd OF 32 CYCLES |
| F | 00000000000000000000000000011000 | |
| | | |
| C | 00000000000000000000000011101000 | TRANSFER D TO C |
| D | 00000000000000000000000011101000 | |
| | | |
| A | 00000000000000000000000000000000 | |
| B | 00010100000000000000000011101000 | 3rd–32nd |
| C | 00000000000000000000000011101000 | OF 32 CYCLES |
| D | 00000000000000000000000011101000 | $D_X = B_X(C_{X+1} + D_X + C_{X-1})$ |
| F | 00000000000000000000000000011000 | THEN RESET C |

Table IV – Continued

| | | |
|---|---|---|
| C | 00000000000000000000000011101000 | TRANSFER D TO C |
| D | 00000000000000000000000011101000 | |
| | | |
| A | 00000000000000000000000000000000 | |
| B | 00010100000000000000000011101000 | |
| C | 00000000000000000000000011100000 | SHIFT C (32X) TO TRANSFER RIGHT |
| D | 00000000000000000000000000001000 | MOST BLOCK OF 1's FROM C TO D |
| F | 00000000000000000000000000011000 | |
| | | |
| A | 00000000000000000000000000000000 | C INDICATOR BIT = 1 |
| B | 00010100000000000000000011101000 | D INDICATOR BIT = 1 |
| C | 00000000000000000000000011100000 | SET SPAN START X = 11011(27) |
| D | 00000000000000000000000000001000 | AND SET TOTAL SPAN LENGTH |
| F | 00000000000000000000000000011000 | ΔX = 00010(2) |

TABLE 5.–THIRD ODD CYCLE, Y = 5

| | | |
|---|---|---|
| A | 00000000000000000000000000001000 | LOAD A FROM D (RIGHT MOST BLOCK OF 1's FROM Y = 5) |
| B | 00011000000000000000000000000000 | LOAD B FROM Y = 4 (WITH RIGHTMOST ELEMENT ERASED) |
| C | 00000000000000000000000000000000 | |
| D | 00000000000000000000000000000000 | |
| F | 00000000000000000000000000000000 | |
| | | |
| A | 00000000000000000000000000000000 | SHIFT A (32X) TO TRANSFER RIGHT |
| B | 00011000000000000000000000000000 | MOST BLOCK OF 1's FROM A TO F |
| C | 00000000000000000000000000000000 | |
| D | 00000000000000000000000000000000 | |
| F | 00000000000000000000000000001000 | |
| | | |
| A | 00000000000000000000000000000000 | |
| B | 00011000000000000000000000000000 | $C_X = B_X(F_{X+1} + F_X + F_{X-1})$ |
| C | 00000000000000000000000000000000 | $D_X = B_X(C_{X+1} + C_X + C_{X-1})$ |
| D | 00000000000000000000000000000000 | THEN RESET C REPEAT 32X |
| F | 00000000000000000000000000001000 | THEN TRANSFER D TO C |
| | | |
| A | 00000000000000000000000000000000 | |
| B | 00011000000000000000000000000000 | |
| C | 00000000000000000000000000000000 | SHIFT C (32X) TO TRANSFER RIGHT |
| D | 00000000000000000000000000000000 | MOST BLOCK OF 1's FROM C TO D |
| F | 00000000000000000000000000001000 | |
| | | |
| A | 00000000000000000000000000000000 | |
| B | 00011000000000000000000000000000 | |
| C | 00000000000000000000000000000000 | C INDICATOR BIT = 0 |
| D | 00000000000000000000000000000000 | D INDICATOR BIT = 0 |
| F | 00000000000000000000000000001000 | |

TABLE 6.–THIRD EVEN CYCLE, Y = 5

| | | |
|---|---|---|
| A | 00000000000000000000000000001000 | LOAD A FROM F (RIGHT MOST BLOCK OF 1's FROM Y = 5) |
| B | 00010010000000000000000001001000 | LOAD B FROM Y = 6 |
| C | 00000000000000000000000000000000 | |
| D | 00000000000000000000000000000000 | |
| F | 00000000000000000000000000000000 | |
| | | |
| A | 00000000000000000000000000000000 | SHIFT A (32X) TO TRANSFER RIGHT |
| B | 00010010000000000000000001001000 | MOST BLOCK OF 1's FROM A TO F |
| C | 00000000000000000000000000000000 | |
| D | 00000000000000000000000000000000 | |
| F | 00000000000000000000000000001000 | |
| | | |
| A | 00000000000000000000000000000000 | |
| B | 00010010000000000000000001001000 | $C_X = B_X(F_{X+1} + F_X + F_{X-1})$ |
| C | 00000000000000000000000000001000 | $D_X = B_X(C_{X-1} + C_X + C_{X-1})$ |
| D | 00000000000000000000000000001000 | THEN RESET C REPEAT 32X |
| F | 00000000000000000000000000001000 | THEN TRANSFER D TO C |
| | | |
| A | 00000000000000000000000000000000 | |
| B | 00010010000000000000000001001000 | |
| C | 00000000000000000000000000000000 | SHIFT C (32X) TO TRANSFER RIGHT |
| D | 00000000000000000000000000001000 | MOST BLOCK OF 1's FROM C TO D |
| F | 00000000000000000000000000001000 | |
| | | |
| A | 00000000000000000000000000000000 | C INDICATOR BIT = 0 |
| B | 00010010000000000000000001001000 | D INDICATOR BIT = 1 |
| C | 00000000000000000000000000000000 | SET SPAN START X = 11100(28) |
| D | 00000000000000000000000000001000 | AND SET TOTAL SPAN LENGTH |
| F | 00000000000000000000000000001000 | ΔX = 00001(1) |

FLOWCHART DESCRIPTION

The flowchart of a controlling program designed to perform the separation process as illustrated by the sequence of operations described with reference to FIGS. 1 through 4 is shown in FIGS. 8A–E. In some respects the flowchart speaks for itself but a detailed explanation of the general procedure set forth therein will now be described.

Figure 8A:
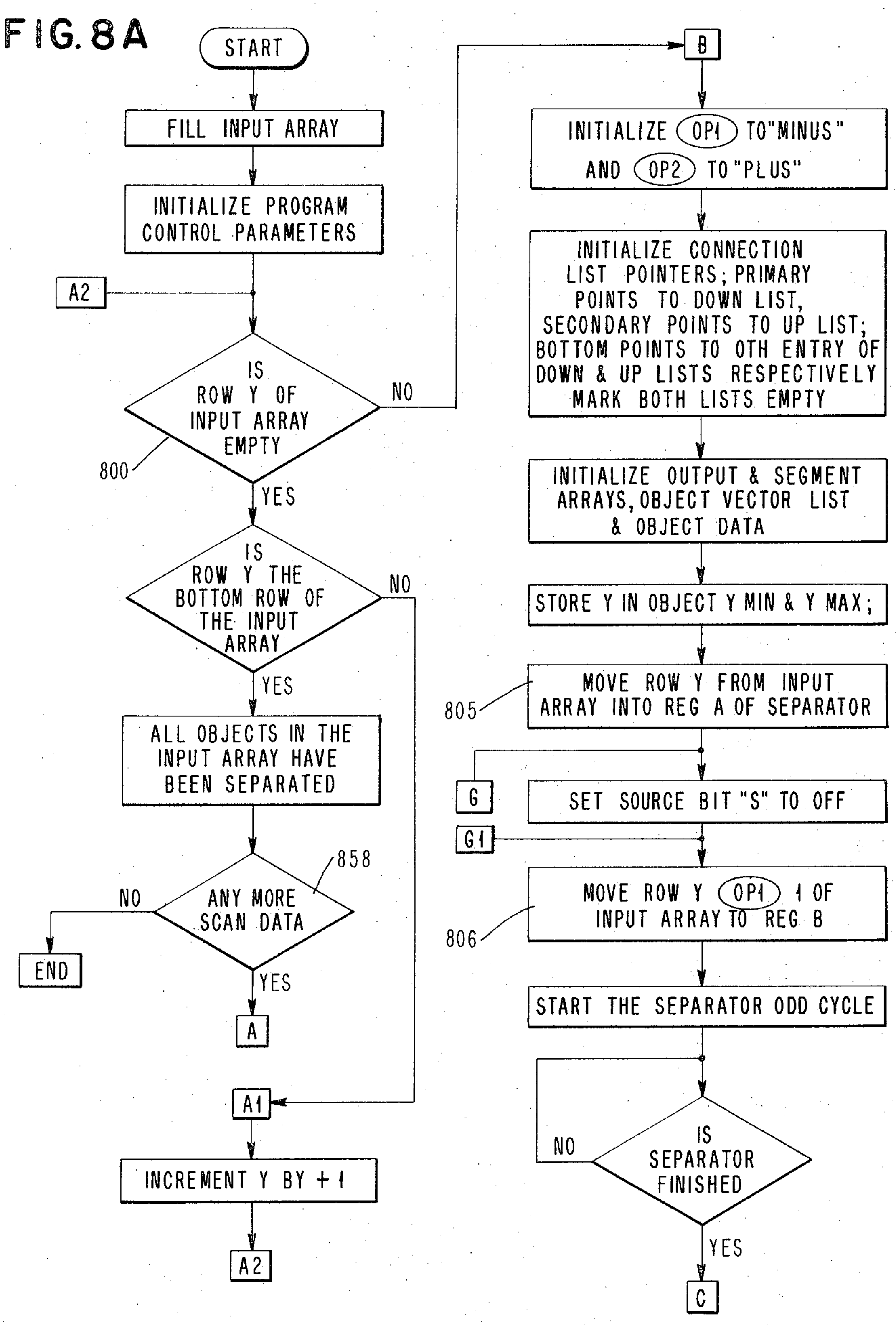
FIGS. 8A–E are a flowchart schematic diagram of the controlling program.
Figure 8B:
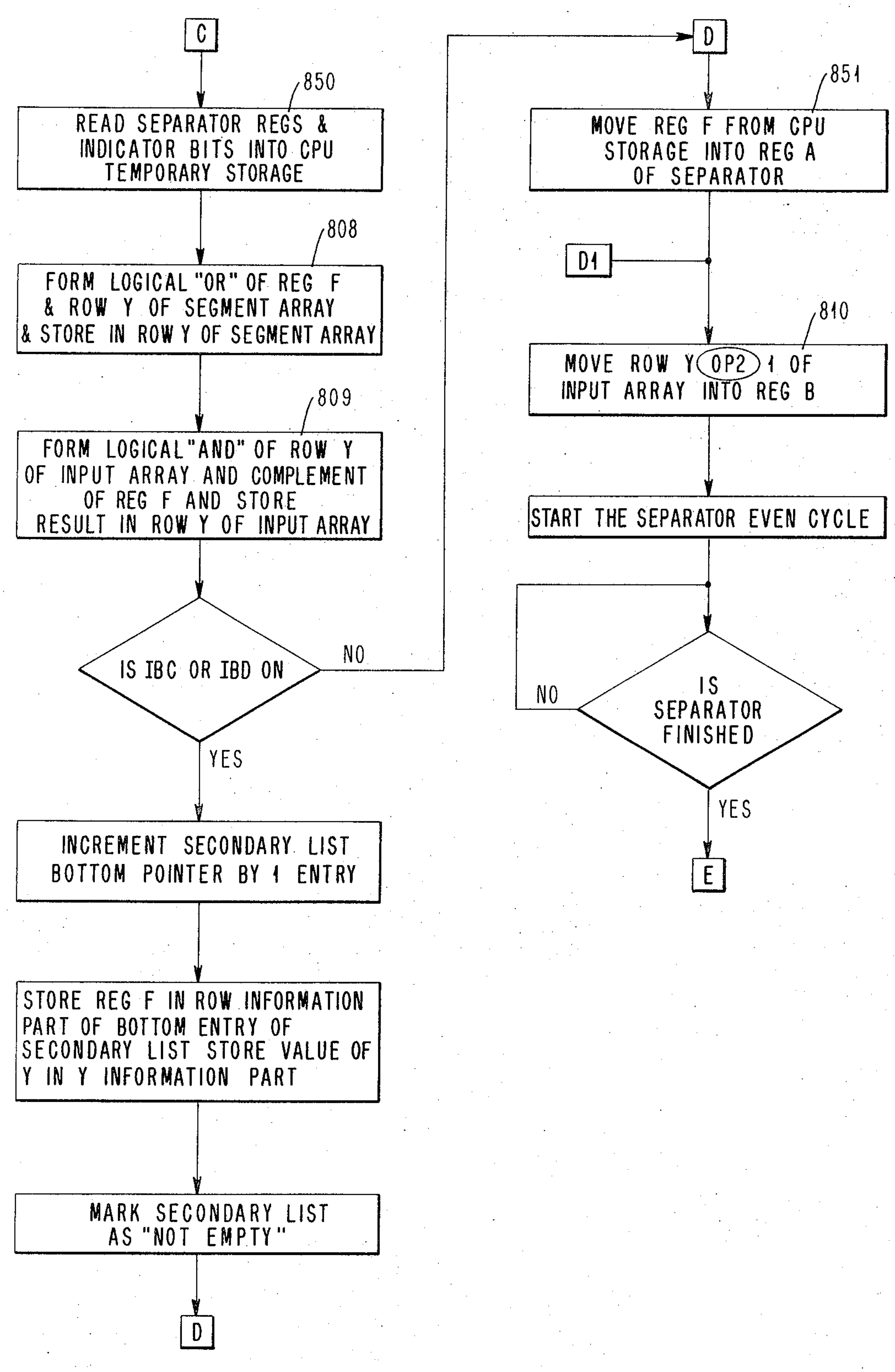

Referring to FIG. 8A, it may be noted that the first program step is to fill the input array with a digital representation of the portion of the document being scanned. That is done through the coordination of the scanner, channel, main storage, etc., as shown on FIG. 2, the details of which form no part of this invention. After that first step, certain program control parameters should be initialized, for example, Y should be set equal to 0 and a decision should be made by the program user as to whether he desires the digitizing bit 803 in FIG. 9 set on or off. The purpose of the digitizing bit is to signal a branch to a digitizing routine at a specific point to be reached later in the program if it is desired to obtain the X and Y coordinates of the graphical segment being separated. Thus, if the user knows that he is dealing with textual information or if he knows that he wants to separate out only textual information, he can leave the digitizing bit 803 off and avoid unnecessary calculations.

Utilizing the example shown in FIG. 4, the first flowchart decision block 800 on FIG. 8A will be answered in the affirmative for the lines Y=0, Y=1 and Y=2. Since none of those lines are the bottom row of the input array, a loop will be taken through A1 and A2 until a succession of one state bits is found in the line Y=3. At this point, decision block 800 dictates a branch to B and various other parameters are now initialized.

Figure 9A:
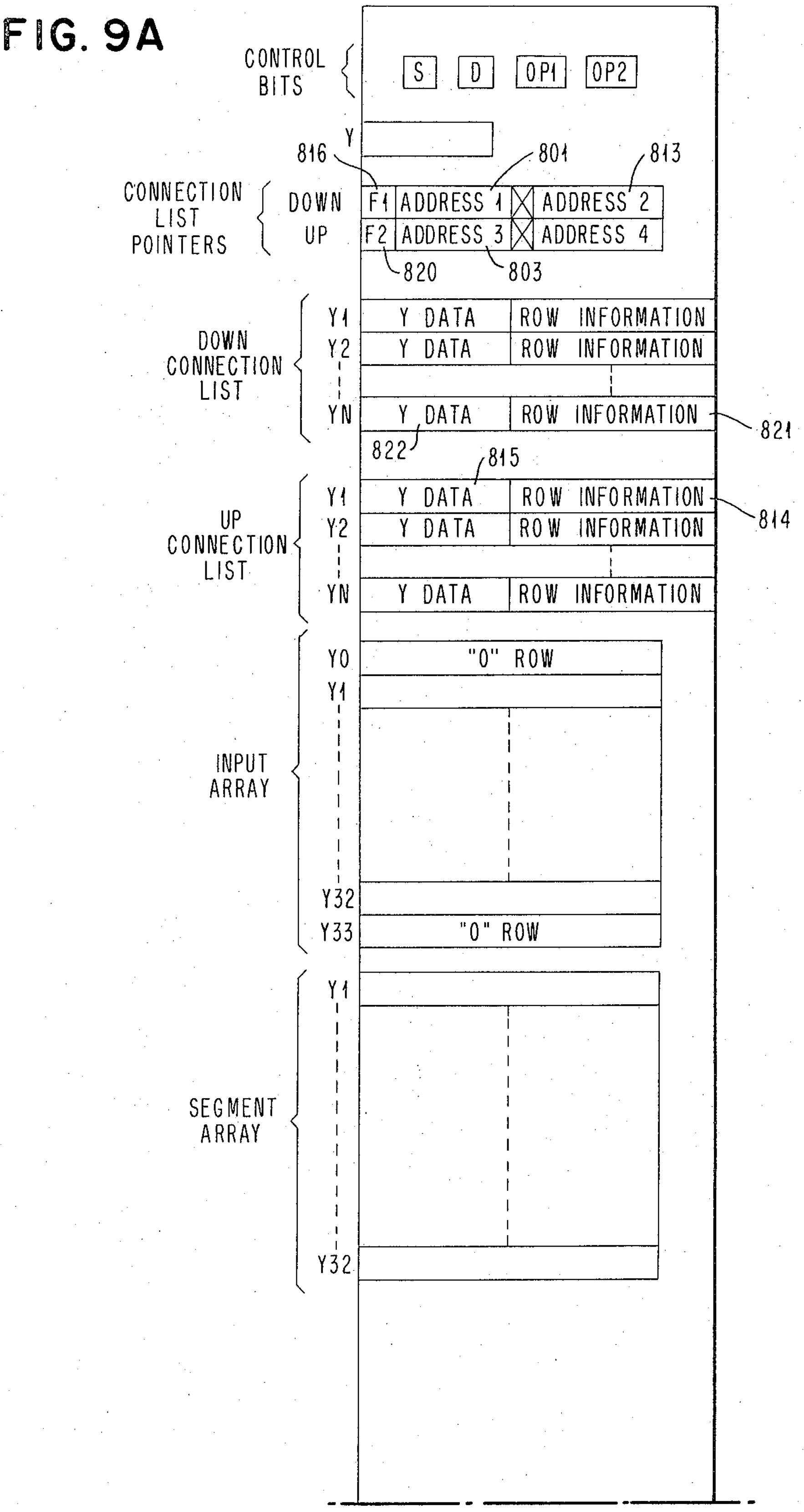
FIGS. 9A–B are a storage map of areas set aside in main storage for use of the program.
Figure 9B:
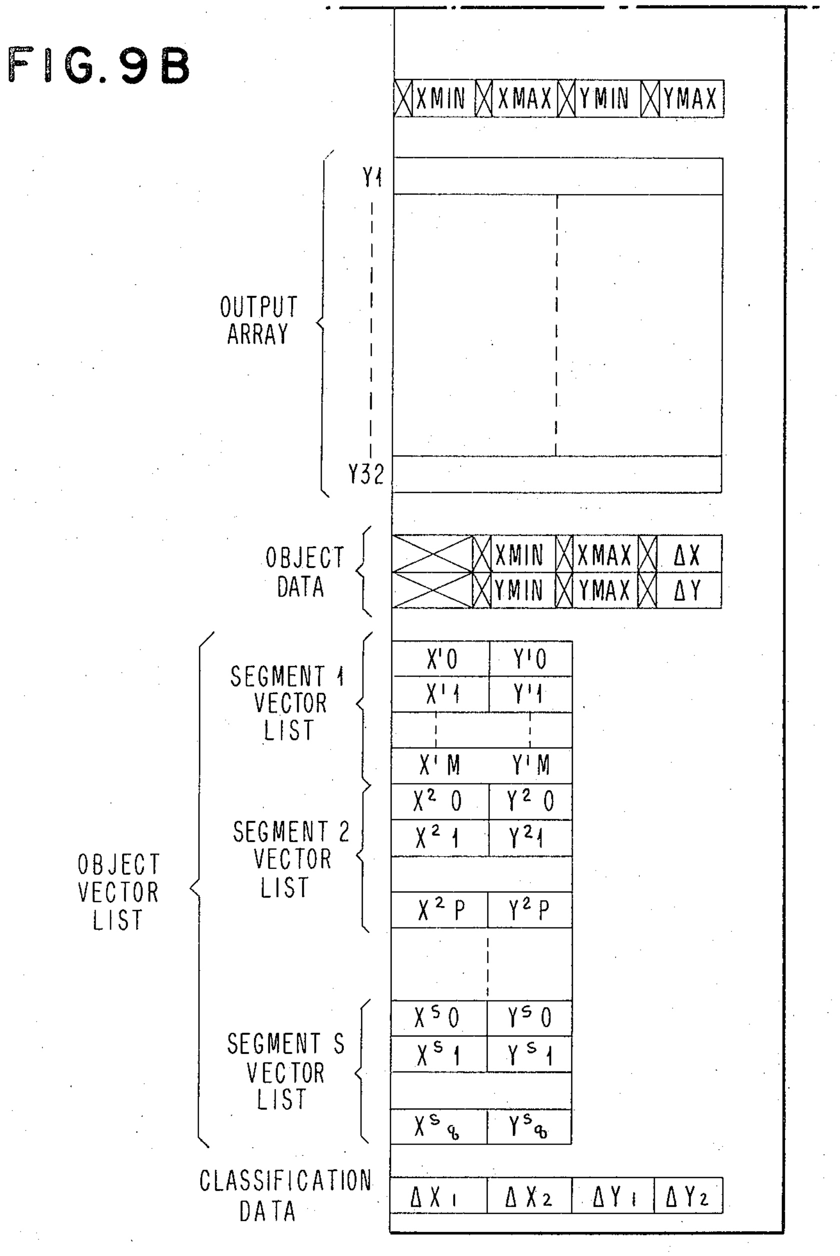

These parameters and their initialization may be understood more readily with reference to FIG. 9 which is a storage map of the various areas in main storage which are set aside for use by the program. For example, in the storage map of the connection list pointers, the address of the first entry in the down connection list will be inserted at the location address 1 shown at 801. The flag F1 will be set to zero indicating that the down list is empty. Similarly, address 3 shown at 802 will be initialized to the address of the up connection list and the flag 2 will be initialized to zero indicating that the up list is empty. Addresses 2 and 4 represent last entries into the respective lists and contain no usable information at this time and do not require initialization. The output and segment arrays are initialized to zero as is the object vector list and the classification data. For the object and segment data, X max is set equal to 32, X min equal to 0; both Y min and Y max are set equal to Y=3. The source bit "S" at 804 is set to zero to indicate that the Y data being analyzed is from the input array and not from a connection list. The purpose of the S bit is to control the need to erase information from the input array after an element has been analyzed. As already described, elements under analysis may come from the input array in which case it is erased therefrom, or it may come from the up or down connection list in which case no element is erased from the input image.

The line Y=3 is stored in register A of the scan data separator as shown at 805 of FIG. 8A. The line Y=2 is stored in register B of the separator as shown at 806 and the separator odd cycle is started. A detailed explanation of the operation of the separator has been described above and at this time, it is only necessary to state that the separator will compare the two rows to determine whether there are any upward connections from the rightmost set of one state bits in the line Y=3 to the line Y=2. After the separator performs its analysis, appropriate separator registers and indicator bits are read into the CPU temporary storage as previously described and as shown at 850 on FIG. 8B.

Register F of the separator will contain the rightmost set of ones in the line Y=3. By performing a logical OR of register F with row Y of the segment array as shown at 808, FIG. 8B, only the rightmost ones of row Y=3 is placed into the segment array for the even cycle. By performing a logical AND of row Y of the input array and the compliment of the contents of separator register F as shown at 809, the rightmost set of one state bits in the Y line is erased from the input array.

Next, the indicator bit for the C register and the indicator bit for the D register are tested to determine whether either one has been set on during the odd cycle of separator performance. The indicator bit for the D register indicates whether the D register contents are zero. If they are, it means that there are no connections in the upward direction. The indicator bit for the C register, if it is set on, will indicate that there are multiple connections in the upward direction. In the example with which we are working, both indicator bits will be off and we will proceed to D in FIG. 8B.

Knowing that there are no connections in the upward direction, we can now proceed to test for connections in the down direction. First, the contents of register F are moved at 851 into register A of the separator. This places the rightmost set of one state bits from the line Y=3 into register A. Line Y=4 is moved from the input array into register B as shown at 810 and the separator even cycle is started to test for downward connectivity. When the separator's activity is finished, the registers and indicator bits are read into temporary storage as shown at 852 of FIG. 8C. At this time in our example, X min is updated to the value X=3 and X max is calculated to be equal to 28 as shown at 807. The ΔX span of 25 is information derived from the scan data separator I register as is the X min value. Next the indicator bit for the C register is queried at 811 and, in our case, the separator will have noted multiple connections in the downward direction and therefore, the answer will be Yes causing us to query at 812 the source bit to determine whether the source is from the input array. Finding that it is (the source bit if off), we increment the primary list bottom pointer at 813, FIG. 9, by one entry, store the contents of register F in the row information part 814, FIG. 9, of the primary list and the value Y=3 in the Y information part 815, FIG. 9. Flag 1, at 816, FIG. 9, will be turned on to note that the primary or down list is not empty. Next, at 817, FIG. 8C, the indicator bit for the D register will be queried and found on (since this bit indicates the presence of a rightmost set of one state bits in the downward direction connecting to the element under study) and the contents of register D are moved into register A. Consequently, the rightmost set of bits in the line Y=4 now resides in register A and becomes the next element for study. Y information is updated to equal 4 and a branch is made at G back to FIG. 8A where the source bit again is continued in the off state since the information source is the input array and not one of the connection lists.

Figure 8C:
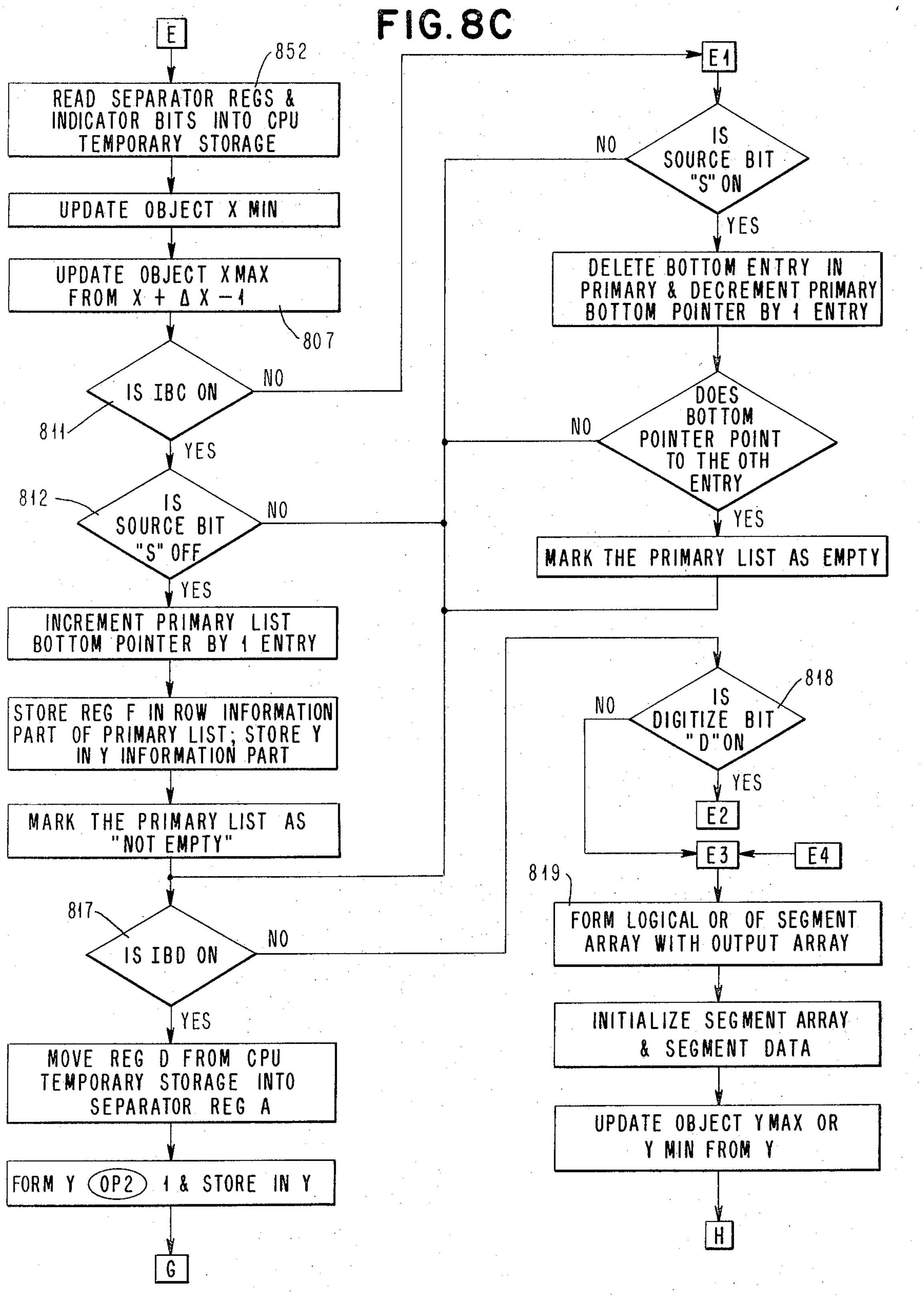
Figure 8D:
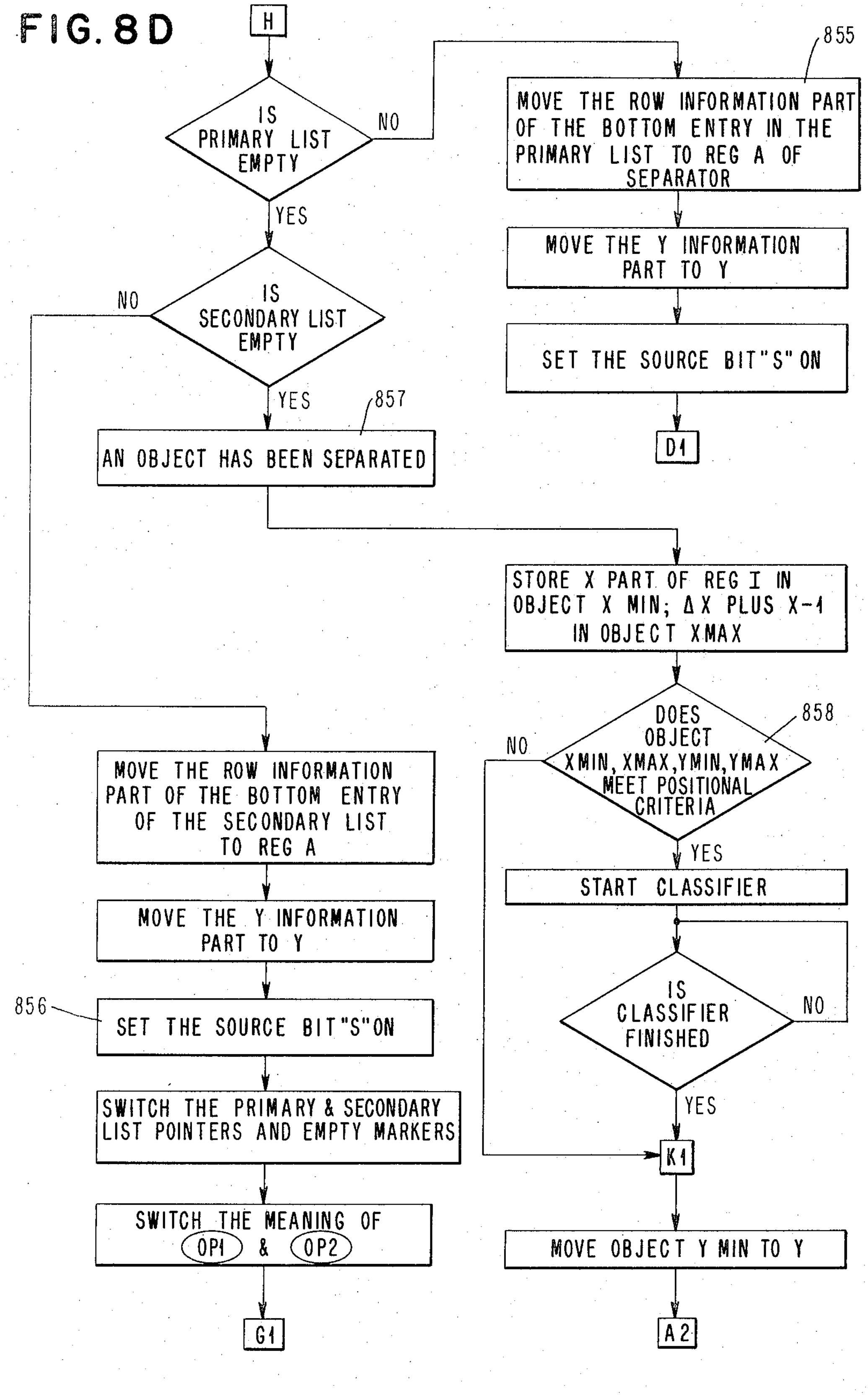
Figure 8E:
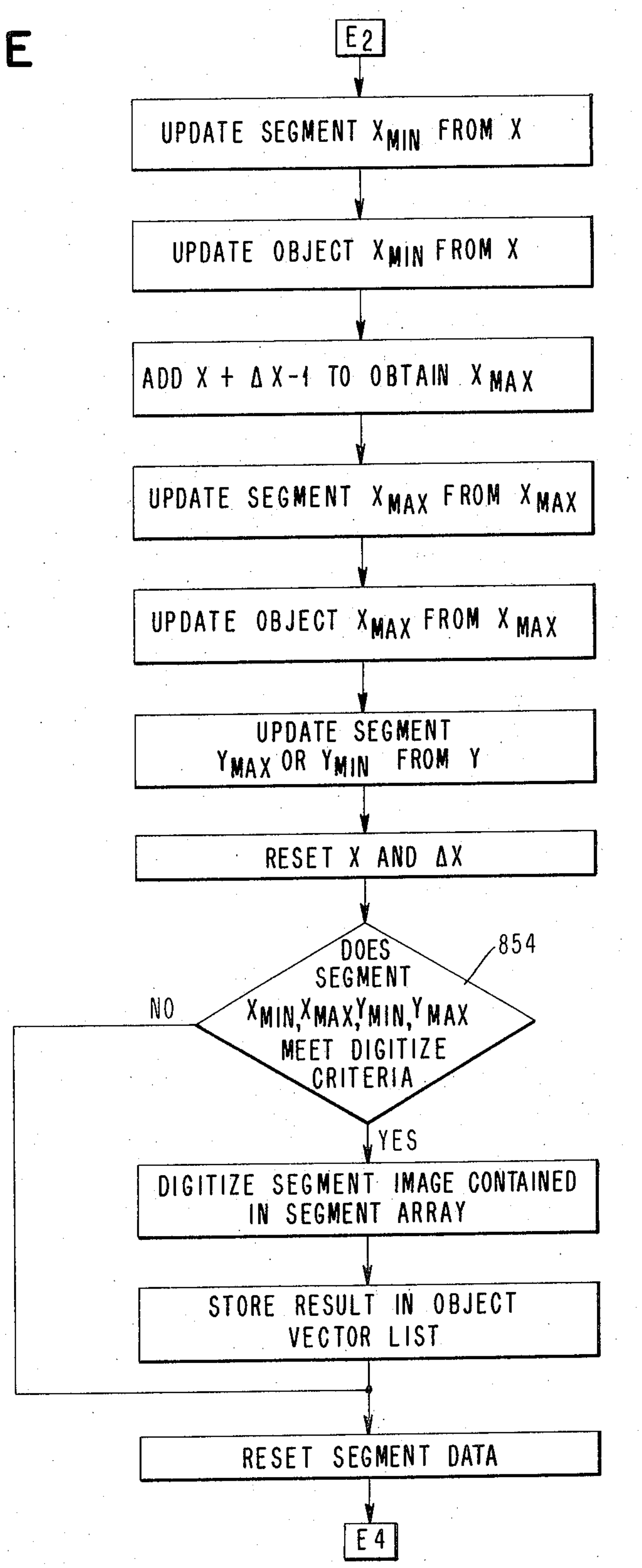

The program operation will continue as previously described checking for connectivity in succeeding elements until it is found that the indicator bit for the D register at 817, FIG. 8C, was not turned on by the separator, indicating that a segment has now been separated. At this point, a branch will be made as shown on FIG. 8C to query the digitizing bit at 818. If the bit has been turned on, it means the user of the program is working or is expecting to work with graphical data and will desire to digitize the information which has been set aside in the segment. A digitizing routine is outlined in FIG. 8E and stores the X and Y coordinates of the line segment image contained in the segment array so that the image can be retained in storage in an efficient manner as opposed to storing the entire segment array during the continued processing of the remaining segments in the object. Since digitizing routines form no part of the instant invention, a detailed description is not provided here. However, it should be noted that the digitize criteria referred to at 854, FIG. 8E, is the concentric square criteria described previously whereby information exceeding a certain size is digitized since it is considered graphical while other information is not. Returning to FIG. 8C at E3, since we know that the segment has been completed (indicator bit for the D register was off) we may now transfer the segment array to the output array, update the object Y max from Y and branch to FIG. 8D at H.

At this point, the program begins to work with the up and down connection lists asking first if the primary list (down list at this point in the program) is empty. If it is not, the row information part of the bottom entry in the primary list is moved into register A of the separator at 855; the Y information part is inserted in Y, the source bit is set to on to indicate that now we are working with an element stored in a connection list rather than with information from the input array and a branch is made to D1 on FIG. 8B. A check is made (separator even cycle) to see if there is any further downward connectivity from the element under study and regardless of whether such a connectivity is multiple or not, eventually the indicator bit for the D register is tested at 817, FIG. 8C, as previously described. Cycling through the odd and even cycles will continue again as previously described until a condition will be found in which the D register bit at 817 is off indicating another segment has been separated and the query for digitizing the segment at 818 will again be asked. The segment array will be transferred to the output array at 819, and after the object Y max is updated, a branch will be made to H on FIG. 8D. Again, the flag bit F1 at 816, FIG. 9, will be queried to determine whether the primary list is empty. Assuming that now it is, the secondary list (up list at this point in our example) will be queried by testing the flag F2 at 820, FIG. 9. Assuming that the secondary list is not empty, the row information part of the bottom entry 821, FIG. 9, of the up list is moved to register A. The Y information part 822, FIG. 9, is moved to Y, the source bit is set on at 856, FIG. 8D, to indicate we are working from a connection list and the primary and secondary list pointers and empty flags are switched as well as the meaning of the operators OP1 and OP2, all as shown in FIG. 8D. These switching operations are performed to avoid duplication in programming and are essentially optional. A branch is now taken to G1 on FIG. 8A where the row Y-1 of the input array is moved into register B and the separator odd cycle is started. Making the switches just discussed causes the odd cycle to test for downward connectivity rather than upward. If connectivity is found, additional entries are made in the connection list. Eventually there will be no additional connectivity in the up direction and the program will return to FIG. 8D to ask whether the primary list is empty. This is now the up list; if the answer is no, the list will be processed as before discussed. If the answer is yes, the secondary list will be queried and processed until both lists are empty. At this point we known that an object has been completely separated as shown at 857 on FIG. 8D. The object X min and X max are updated to their final values and query is made as to whether these coordinates meet positional criteria at 858.

Figure 10:
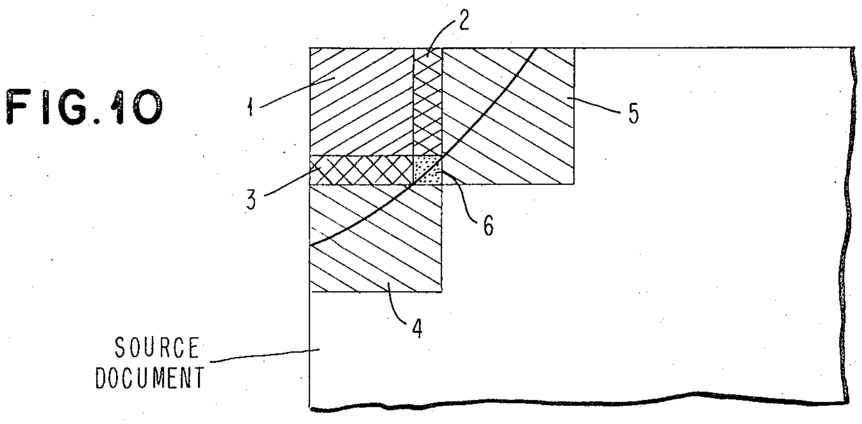
FIG. 10 is an illustration of the overlap mode of scanning the source document.

The meaning of positional criteria may be understood from FIG. 10. Here the first input image includes the areas 1, 2, 3 and 6. If positional criteria is met, a portion of the object separated will exist in area 1. Since that is not true in the example given in FIG. 10, a classifying action will not be undertaken at this time. Another input image will be chosen so as to slightly overlap the first input image and will include the areas 3, 4, and 6. A subsequent scan will include the areas 2, 5, and 6. As a result of the overlapping action, any object information separated in the first scan, but not meeting positional criteria, will again be noted in subsequent scans and at some point will meet positional criteria. The purpose of the overlapping of input images and the use of positional criteria is to avoid the immediate classification of small segments of input images as scrap when they are really small segments of large objects to be found in subsequent scans.

After classification is accomplished, the Y minimum found in separating the object is moved to the Y position and a branch is made back to FIG. 8A where a search is made for another object in the input image. If a second object is located, the program will be repeated to separate that object but if none is found, and when the scan reaches the bottom row of the input array, it will be known that the entire input image has been scanned and all objects in the input array have been separated. If there are additional portions of the source document to scan, those scans will be made in the overlapping fashion previously described and the entire program will again be exercised. Eventually, when the source document has been entirely scanned, the program will end as shown at 858, FIG. 8A.

Certain techniques described in the preferred embodiment are manifestly the kind of art which lends itself to alternative forms, e.g., arbitrary orders of search were chosen as were arbitrary rules for determining connectivity. Also, it is clearly a matter of choice to the skilled artisan whether it is most desirable to digitize elements, segments or complete objects. The scanning of portions of a document as opposed to preparing a binary map of the complete document at one time is a matter of choice dictated by the need for economy in storage usage. Should it be possible to write the entire binary map at once, the difficulties solved by the additional complexities of the overlapping scan technique could be avoided. It is also clear that discriminating bits could be added, if desired, to the control parameter list to afford a simple means of skipping the analysis of certain elements, segments or objects in order to search out and analyze a particular item only.

While the invention has been particularly shown and described with reference to a preferred embodiment, it will be understood by those skilled in the art that the foregoing and other changes in form and details may be made therein without departing from the spirit and scope of the invention.

What is claimed is:

1. Apparatus for determining the connectivity of one state bits in a digital element in a single row to one state bits in the next adjacent row, said element comprised of a contiguous span of one state bits in said single row, where connectivity is defined to exist where a one state bit in said adjacent row directly adjoins a one state bit in said element along either a vertical or diagonal axis, said apparatus comprising a first register means for containing a desired element to be analyzed for connectivity, a second register means for containing a single row adjacent to the row containing said desired element, comparator means for simultaneously comparing all bit positions in said first register to corresponding bit positions in said second register to determine said connectivity and for transmitting a signal corresponding to each bit position in said second register where said connectivity is found to exist, and a third register means for receiving said transmitted signals for simultaneously setting all bit positions in said third register to contain one state bits at those bit positions for which signals are received from said comparator whereby said third register is caused to contain a bit representation pattern of the connectivity of a digital element to its next adjacent row.

2. The apparatus of claim 1 further including a fourth register means for receiving signals from said third register means, said signals setting all bit positions in said fourth register to a bit representation pattern of only the rightmost element of the connectivity pattern in said third register.

3. A method for determining the connectivity of one state bits in a digital element in a single row to one state bits in the next adjacent row, said element comprised of a contiguous span of one state bits in said single row, where connectivity is defined to exist where a one state bit in said adjacent row directly adjoins a one state bit in said element along either a vertical or a diagonal axis, said method comprising the steps of writing a desired element to be tested for connectivity into a first register means, writing a single row directly adjacent to the row containing said desired element into a second register means, simultaneously comparing all bit positions in said first register to corresponding bit positions in said second register to determine said connectivity, transmitting a signal corresponding to each bit position in said second register where said connectivity is found to exist, and receiving said transmitted signals for simultaneously setting all bit positions in said third register to contain one state bits at those bit positions for which signals are received from said comparator, whereby said third register is caused to contain a bit representation pattern of the connectivity of a digital element to its next adjacent row.

4. The method of claim 3 including the additional step of writing one state bits into a fourth register means at bit positions corresponding to the rightmost element of the connectivity pattern contained in said third register means.

* * * * *